US012736460B2

(12) United States Patent
Sasaki et al.

(10) Patent No.: US 12,736,460 B2
(45) Date of Patent: Sep. 15, 2026

(54) CORROSION RESISTANCE TEST METHOD, CORROSION RESISTANCE TEST APPARATUS, AND CORROSION RESISTANCE TEST PROGRAM FOR COATED METAL MATERIAL, AND RECORDING MEDIUM

(71) Applicant: MAZDA MOTOR CORPORATION, Hiroshima (JP)

(72) Inventors: Katsunobu Sasaki, Aki-gun (JP); Teruaki Asada, Aki-gun (JP); Tatsuya Ezaki, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 252 days.

(21) Appl. No.: 18/672,433

(22) Filed: May 23, 2024

(65) Prior Publication Data

US 2024/0402070 A1 Dec. 5, 2024

(30) Foreign Application Priority Data

May 31, 2023 (JP) ................................. 2023-090276

(51) Int. Cl.
*G01N 17/00* (2006.01)
*G01N 17/02* (2006.01)

(52) U.S. Cl.
CPC ........... *G01N 17/006* (2013.01); *G01N 17/02* (2013.01)

(58) Field of Classification Search
None
See application file for complete search history.

(56) References Cited

U.S. PATENT DOCUMENTS

2021/0010926 A1* 1/2021 Asada .................... G01N 17/02
2021/0395914 A1* 12/2021 Asada ................. G01N 17/006
2022/0099556 A1* 3/2022 Asada ................. G01N 17/006
2023/0258555 A1* 8/2023 Sato ..................... G01N 17/006
2025/0305934 A1* 10/2025 Sasaki ................. G01N 17/006

FOREIGN PATENT DOCUMENTS

EP 3974806 A1 * 3/2022 ............. G01N 17/02
JP 2003-344332 A 12/2003
JP 2016-050915 A 4/2016
JP 2021-085692 A 6/2021

* cited by examiner

*Primary Examiner* — Stephanie E Bloss
*Assistant Examiner* — Diana Hancock
(74) *Attorney, Agent, or Firm* — Studebaker Brackett PLLC

(57) ABSTRACT

A corrosion resistance test method for a coated metal material, the method including: a preparation step of arranging one or two containers holding a water-containing material and one or two electrodes, and electrically connecting the electrode and the metal base to each other or the two electrodes to each other; a current supply step of supplying a current between the electrode serving as an anode and the metal base serving as a cathode or between one of the two electrodes serving as an anode and the other electrode serving as a cathode to cause corrosion of the coated metal material to progress; a calculation step of calculating a progress degree of the corrosion; a correction step of correcting the progress degree based on a posture of the test target portion; and an evaluation step of evaluating corrosion resistance based on a correction value for the progress degree.

11 Claims, 11 Drawing Sheets

FIG.2

DIGITAL PHOTOMICROGRAPH
RELATIONSHIP BETWEEN INCLINATION ANGLE AND PROGRESS DEGREE OF CORROSION (PEELING DIAMETER)
0°
10.5mm
45°
7.2mm
90°
5.4mm
y=−0.0567X+10.25
R2=0.972
PEELING DIAMETER (mm)
ANGLE (° )
0
2
4
6
8
10
12
20
40
60
80
100

PEELING WIDTH (mm)
b
L
SLOPE a
$A_0$
A
0
θ
90
ANGLE (°)

PEELING WIDTH (mm)
b
L
SLOPE a
$A_0$
A
0
θ
90
ANGLE (°)

11
127A
122A
100
120
110
150
A
130
111
111A
A 11
6
122A
127A
100
127B
122
122B
123
150
120
121
F
130
5(E)
X
110
111
F
θ
0°
F
1

11
122A
127B
127A
5(E)

10
71(7)
−
+
8
11
12
11
12
6
6
CATHODE
12a
12a
ANODE
1
4
5
E
5
F
F
3
e⁻
2
5A
5A
ANODE SITE
$Fe \rightarrow Fe^{2+} + 2e^-$
CATHODE SITE
$2H_2O + 2e^- \rightarrow H_2 + 2OH^-$
$2H^+ + 2e^- \rightarrow H_2$
$H_2O + 1/2O_2 + 2e^- \rightarrow 2OH^-$

CORROSION RESISTANCE TEST METHOD, CORROSION RESISTANCE TEST APPARATUS, AND CORROSION RESISTANCE TEST PROGRAM FOR COATED METAL MATERIAL, AND RECORDING MEDIUM

CROSS-REFERENCE TO RELATED APPLICATION

This application claims priority to Japanese Patent Application No. 2023-090276 filed on May 31, 2023, the entire disclosure of which is incorporated by reference herein.

BACKGROUND

The present disclosure relates to a corrosion resistance test method, a corrosion resistance test apparatus, and a corrosion resistance test program for a coated metal material and a recording medium.

BACKGROUND ART

As a technique for evaluating the properties of a coating film, an accelerated corrosion test such as a combined cycle test or a salt spray test has been performed.

Such an accelerated corrosion test requires several months for evaluation. It is thus difficult to simply evaluate, for example, the states of coating films to be coated on steel sheets made of different constituent materials under different baking conditions and to rapidly provide optimum coating conditions. Thus, in material development, process control in coating factories, and quality control related to rust prevention for vehicles, it has been desired to establish a quantitative evaluation method for rapidly and simply evaluating corrosion resistance of coated steel sheets.

Japanese Unexamined Patent Publication No. 2016-50915 discloses that an electrode is arranged on the side closer to the surface of a coating film of a coated metal material through an electrolyte material, that a voltage is applied between a base substrate of the coated metal material and the surface of the coating film, and that corrosion resistance of the coated metal material is evaluated based on the voltage value at the time when electrical breakdown of the coating film occurs.

Japanese Unexamined Patent Publication No. 2021-085692 discloses a corrosion test apparatus including: a test tank which can be filled with an electrolyte solution and in which a metal sample is arranged; an indenter which can be inserted into the test tank; and an inclination measurement device which can measure the inclinations of end surfaces of the metal sample and the indenter. It is described that electrochemical measurement can be performed while forming a water film having a uniform thickness on the surface of the metal sample by the apparatus.

Japanese Unexamined Patent Publication No. 2003-344332 discloses an electrochemical measurement cell in which: a cell body is a magnet sheet including an opening of a certain size for holding a paste-like electrolyte solution and a cover for preventing the electrolyte solution from drying; a counter electrode member having small polarization is placed in the opening; the entire cell is covered with a conductive shielding material; the conductive shielding material is detachably held on a coating film through a highly insulating material; and the cell is grounded. Japanese Unexamined Patent Publication No. 2003-344332 also disclose an electrochemical measurement method using the electrochemical measurement cell. It is described that according to the cell and the method, measurement can be performed regardless of the state of the surface to be coated (such as a curved surface, a surface with severe unevenness, a vertical surface, or a downward surface), making it possible to avoid influence of external noise and perform accurate measurement.

In this specification, Japanese Unexamined Patent Publication No. 2016-50915, No. 2021-085692 and No. 2003-344332 are referred to Patent Documents 1 to 3, respectively.

SUMMARY

As in Patent Documents 1 to 3, various methods have been developed as the quantitative evaluation method for rapidly and easily evaluating the corrosion resistance of the coated metal material. However, there has been a problem that measurement accuracy varies depending on the posture and shape of the measurement sample.

On this point, the technique of Patent Document 3 tries to secure the measurement accuracy by the configuration of the measurement cell itself, regardless of the posture and shape of the measurement sample.

However, in a case where gas is generated by chemical reaction during the test, outgassing of the gas varies depending on the posture and shape of the measurement sample, which may affect the measurement accuracy. In the known technique, such outgassing is not taken into consideration; therefore, there is still room for improvement in order to improve the measurement accuracy.

An objective of the present disclosure is to provide a corrosion resistance test method, a corrosion resistance test apparatus, and a corrosion resistance test program for a coated metal material, which can improve the accuracy and reliability of a corrosion resistance test regardless of the posture of a test target portion.

Solution to the Problems

In order to solve the above problems, an aspect of a corrosion resistance test method for a coated metal material disclosed herein is a corrosion resistance test method for a coated metal material including a metal base and a surface treatment film provided on the metal base, the method including:

a preparation step of arranging one or two containers holding a water-containing material such that the water-containing material is in contact with the surface treatment film at a test target portion of the coated metal material and one electrode in contact with the water-containing material in the one container or two electrodes in contact with the respective water-containing materials in the two containers, and electrically connecting, through an external circuit, the electrode and the metal base to each other or the two electrodes to each other;

a current supply step of supplying a current, with a current supplier provided on the external circuit, between the electrode serving as an anode and the metal base serving as a cathode or between one of the two electrodes serving as an anode and the other electrode serving as a cathode to cause corrosion of the coated metal material to progress;

a calculation step of calculating a progress degree of the corrosion in the current supply step;

a correction step of correcting the progress degree of the corrosion based on a posture of the test target portion; and an evaluation step of evaluating corrosion resistance of the coated metal material based on a correction value for the progress degree of the corrosion.

In general, metal corrosion is known to progress through an anode reaction (oxidation reaction) of generating free electrons by melting (ionizing) metal that is in contact with water and a cathode reaction (reduction reaction) of generating hydroxide ions OH from dissolved oxygen in water by the free electrons occurred in parallel.

In this configuration, a current is supplied between the electrode and the metal base, or between one of the two electrodes and the other electrode, as the anode and the cathode, respectively. For the current supply between the electrode serving as an anode and the metal base serving as a cathode, the cathode reaction progresses in a contact portion between the water-containing material and the metal base when the water-containing material permeating into the surface treatment film reaches the metal base. For one of the two electrodes serving as the anode and the other electrode serving as the cathode, the cathode reaction progresses in a contact portion between the metal base and the water-containing material on the side closer to the electrode serving as the anode. In any case, electrolysis of water also progresses and hydrogen gas is generated, depending on a current supply condition, that is, under a current supply condition where a voltage equal to or higher than a theoretical voltage (1.23 V in a case where a system temperature is 25° C.) at which electrolysis of water occurs to generate hydrogen, or a current requiring such a voltage, is applied.

As the cathode reaction progresses, the area around the contact portion between the water-containing material and the metal base becomes an alkaline environment due to generation of $OH^-$. This damages an under-treated surface (chemically converted surface) of the metal base, thereby reducing adherence of the surface treatment film (simply reducing adherence between the metal base and the surface treatment film for no treatment performed on the surface of the metal base). Accordingly, the surface treatment film is lifted in the contact portion and swells around the damaged portion. The surface treatment film with a reduced adherence to the metal base in the alkaline environment is further lifted by the hydrogen gas generated due to electrolysis of water and reduction of $H^+$. This causes progression of the swelling of the surface treatment film. Such progress of the cathode reaction and occurrence and progress of the swelling of the surface treatment film are accelerated reproduction of actual corrosion of the coated metal material. That is, "causing corrosion of the coated metal material to progress" in this specification refers to "causing the swelling of the surface treatment film to occur and progress." Accordingly, for example, by checking the occurrence status and the progress degree of the swelling of the surface treatment film that has occurred in the contact portion, the progress degree of corrosion of the coated metal material can be determined.

The posture of the test target portion varies depending on the shape and arrangement of the coated metal material targeted for the test. Outgassing of the hydrogen gas to the outside of the surface treatment film in the current supply step varies depending on the posture of the test target portion. Changes in the outgassing of the hydrogen gas affect the progress degree of corrosion of the coated metal material.

Thus, the correction step is provided to correct the progress degree of corrosion based on the posture of the test target portion. With this configuration, the error in the progress degree of corrosion due to the difference in the outgassing of hydrogen gas can be corrected, and therefore, the accuracy and reliability of the corrosion resistance test can be enhanced.

In this specification, the "test target portion of the coated metal material" means a portion of the coated metal material corresponding to the contact region between the water-containing material and the surface treatment film.

In this specification, the "posture of the test target portion" is used on the assumption that a surface of the metal base included in the test target portion and provided with the surface treatment film is a flat surface, and refers to the posture of that surface.

Preferably, the posture of the test target portion is represented by an inclination angle with respect to a reference posture of the test target portion, and the reference posture is a posture in which the test target portion is substantially in a horizontal direction in a state in which the coated metal material is arranged with the surface treatment film on an upper side.

The posture in which the test target portion is substantially in the horizontal direction in a state in which the coated metal material is arranged with the surface treatment film on an upper side is a posture with the best outgassing of the hydrogen gas, and therefore, the progress degree of corrosion in this posture is most reliable in evaluating the corrosion resistance of the coated metal material. According to this configuration, using this posture as the reference posture, the reliability of the correction value for evaluating the corrosion resistance of the coated metal material is enhanced, and the test accuracy is improved.

In this specification, the "substantially horizontal direction" refers to a direction including the horizontal direction and within an angle range of ±5° from the horizontal direction.

Preferably, the inclination angle is measured in the preparation step, and in the correction step, the progress degree of the corrosion is corrected based on a correlation, which is experimentally obtained in advance, between the inclination angle and the progress degree of the corrosion, and on the inclination angle measured in the preparation step.

According to this configuration, since the progress degree of corrosion is corrected based on the correlation obtained in advance, the corrosion resistance test can be performed with high reliability by a simple configuration.

In an embodiment, the correlation is a relationship in which the progress degree of the corrosion decreases in proportion to the inclination angle, and in the correction step, the progress degree of corrosion is corrected based on Expression (1) below.

$$A_0 = A + a\theta \tag{1}$$

where $A_0$ is the correction value, A is the progress degree of the corrosion, a is a slope of the correlation, and θ is the inclination angle (0°≤θ≤90°).

According to this configuration, the progress degree of corrosion can be corrected accurately using a simple expression.

In an embodiment, the correlation is a relationship in which the progress degree of the corrosion decreases in proportion to the inclination angle, and in the correction step, the progress degree of corrosion is corrected based on Expression (2) below.

$$A_0 = A/[1-(a/b)]\times\theta \quad (2)$$

In Expression (2), $A_0$ is the correction value, A is the progress degree of the corrosion, a is a slope of the correlation, b is an intercept of the correlation, and θ is the inclination angle (0°≤θ≤90°).

According to this configuration, the progress degree of corrosion can be corrected accurately because correction is made in consideration of the intercept of the correlation as well.

Preferably, the coated metal material has, at the test target portion, one or two damaged portions reaching the metal base through the surface treatment film, and the one or two containers are arranged such that the water-containing material is in contact with the one damaged portion or the two damaged portions.

In general, a coated metal material with a surface treatment film starts to corrode after a corrosion factor such as salt water has permeated into the surface treatment film and reached a metal base. Specifically, the process of the corrosion of the coated metal material is divided into a stage until occurrence of corrosion and a stage in which corrosion progresses. The corrosion can be evaluated through determining a period until corrosion starts (i.e., corrosion resistance period) and a rate at which corrosion progresses (corrosion progress rate).

For the coated metal material having the damaged portion reaching the metal base through the surface treatment film as in this configuration, the water-containing material serving as a corrosion factor and arranged in contact with the damaged portion enters the inside of the damaged portion and reaches an exposed portion of the metal base. Upon contact of the water-containing material with the exposed portion of the metal base, corrosion starts in the exposed portion. Then, current supply causes swelling of the surface treatment film to occur and progress around the exposed portion where the cathode reaction progresses. That is, the damaged portion provided in the coated metal material allows creation of a simulated state of the end of the corrosion resistance period out of the process of corrosion of the coated metal material. In this way, the time from the start of current supply to occurrence of the swelling of the surface treatment film can be shortened.

Preferably, in the current supply step, progress of the corrosion of the coated metal material appears as swelling of the surface treatment film that occurs around the damaged portion, and in the calculation step, the progress degree of corrosion is calculated based on a size of the swelling of the surface treatment film, more preferably a size of the damaged portion before current supply and the size of the swelling of the surface treatment film after the current supply.

In this configuration, the progress degree of corrosion of the coated metal material is calculated based on the size of the swelling of the surface treatment film, more preferably the size of the damaged portion before current supply and the size of the swelling of the surface treatment film after the current supply. With this configuration, the corrosion resistance can be evaluated accurately in a simple configuration. Thus, the reliability and versatility of the corrosion resistance test can be improved.

In this specification, the "size of the swelling of the surface treatment film" refers to a swelling diameter or swelling area, or a peeling diameter or peeling area. The "swelling diameter" and the "swelling area" refer to the diameter and area of the swollen portion of the surface treatment film, respectively. The "peeling diameter" and the "peeling area" refer to the diameter and area of a peeled portion which is an exposed surface of the metal base exposed by peeling the swollen portion of the surface treatment film after the corrosion resistance test, respectively.

In this specification, the "size of the damaged portion" refers to the size of the damaged portion in a plan view, and is, for example, the diameter or area of the damaged portion. For example, for a circular damaged portion in a plan view, the area of the damaged portion is given by the area of a circle. The diameter of the damaged portion is given by the maximum width of the damaged portion. In this specification, the size of the damaged portion is assumed to be the same as the size of the exposed portion of the metal base at the damaged portion.

Preferably, in the current supply step, a DC constant current is applied between the electrode and the metal base or between the two electrodes.

Corrosion progresses stably by the application of the DC constant current. Accordingly, the reliability of the test can be improved.

Preferably, the surface treatment film is a resin coating film.

The coated metal material including the metal base on which the resin coating film is formed as the surface treatment film is suitable as a target for the corrosion resistance test because corrosion is likely to progress during current supply.

An aspect of a corrosion resistance test apparatus for a coated metal material as disclosed herein is a corrosion resistance test apparatus for a coated metal material including a metal base and a surface treatment film provided on the metal base, the apparatus including:

one or two containers holding a water-containing material such that the water-containing material is in contact with the surface treatment film at a test target portion of the coated metal material;

one electrode in contact with the water-containing material in the one container or two electrodes in contact with the respective water-containing materials in the two containers;

an external circuit that electrically connects the electrode and the metal base to each other or the two electrodes to each other;

a current supplier provided on the external circuit and configured to supply a current between the electrode serving as an anode and the metal base serving as a cathode or between one of the two electrodes serving as an anode and the other electrode serving as a cathode;

a calculation unit that calculates a progress degree of corrosion of the coated metal material that has progressed due to the current supply;

a correction unit that corrects the progress degree of the corrosion based on a posture of the test target portion; and an evaluation unit that evaluates corrosion resistance of the coated metal material based on a correction value for the progress degree of the corrosion.

The progress degree of corrosion is corrected by the correction unit based on the posture of the test target portion as described above. With this configuration, the error in the progress degree of corrosion due to the difference in the outgassing of hydrogen gas can be corrected, and therefore, the accuracy and reliability of the corrosion resistance test can be enhanced.

Preferably, the coated metal material has, at the test target portion, one or two damaged portions reaching the metal base through the surface treatment film, and the one or two containers are arranged such that the water-containing material is in contact with the one damaged portion or the two damaged portions, progress of the corrosion of the coated metal material appears as swelling of the surface treatment film that occurs around the damaged portion, and the calculation unit calculates the progress degree of corrosion of the coated metal material based on a size of the swelling of the surface treatment film, more preferably a size of the damaged portion before current supply and the size of the swelling of the surface treatment film after the current supply.

The damaged portion provided in the coated metal material allows creation of a simulated state of the end of the corrosion resistance period out of the process of corrosion of the coated metal material. In this way, the time from the start of current supply to occurrence of the swelling of the surface treatment film can be shortened. It is also possible to evaluate the progress degree of the corrosion of the coated metal material accurately by calculating the progress degree of corrosion of the coated metal material based on the size of the swelling of the surface treatment film, more preferably the size of the damaged portion before current supply and the size of the swelling of the surface treatment film after the current supply. Thus, the reliability and versatility of the corrosion resistance test can be improved.

Preferably, the posture of the test target portion is represented by an inclination angle with respect to a reference posture of the test target portion, and the reference posture is a posture in which the test target portion is substantially in a horizontal direction in a state in which the coated metal material is arranged with the surface treatment film on an upper side.

Preferably, the correction unit corrects the progress degree of the corrosion based on a correlation, which is experimentally obtained in advance, between the inclination angle and the progress degree of the corrosion, and on the inclination angle.

The correlation is a relationship in which the progress degree of the corrosion decreases in proportion to the inclination angle, and the correction unit corrects the progress degree of corrosion based on Expression (1) or Expression (2) below:

$$A_0 = A + a\theta \quad (1)$$

where $A_0$ is the correction value, A is the progress degree of the corrosion, a is a slope of the correlation, and θ is the inclination angle (0°≤θ≤90°), $$A_0 = A/[1-(a/b)]\times\theta \quad (2)$$

where $A_0$ is the correction value, A is the progress degree of the corrosion, a is a slope of the correlation, b is an intercept of the correlation, and θ is the inclination angle (0°≤θ≤90°).

A program for a corrosion resistance test of a coated metal material as disclosed herein is a program for a corrosion resistance test of a coated metal material including a metal base and a surface treatment film provided on the metal base, the corrosion resistance test including:

a preparation step of arranging one or two containers holding a water-containing material such that the water-containing material is in contact with the surface treatment film at a test target portion of the coated metal material and one electrode in contact with the water-containing material in the one container or two electrodes in contact with the respective water-containing materials in the two containers, and electrically connecting, through an external circuit, the electrode and the metal base to each other or the two electrodes to each other;

a current supply step of supplying a current, with a current supplier provided on the external circuit, between the electrode serving as an anode and the metal base serving as a cathode or between one of the two electrodes serving as an anode and the other electrode serving as a cathode to cause corrosion of the coated metal material to progress;

a calculation step of calculating a progress degree of the corrosion in the current supply step;

a correction step of correcting the progress degree of the corrosion based on a posture of the test target portion; and an evaluation step of evaluating corrosion resistance of the coated metal material based on a correction value for the progress degree of the corrosion, the program causing a computer to execute a process of the correction step.

The highly reliable corrosion resistance test can be performed by the computer executing the processes of the correction step.

A recording medium disclosed herein is a computer-readable recording medium in which the corrosion resistance test program described above is recorded.

As described above, according to the present disclosure, the correction step is provided to correct the progress degree of corrosion based on the posture of the test target portion. With this configuration, the error in the progress degree of corrosion due to the difference in the outgassing of hydrogen gas can be corrected, and therefore, the accuracy and reliability of the corrosion resistance test can be enhanced.

BRIEF DESCRIPTION OF DRAWINGS

FIG. 2 is a flowchart for describing a corrosion resistance test method according to the first embodiment.

DETAILED DESCRIPTION

Hereinafter, embodiments of the present disclosure will be described in detail with reference to the drawings. The following description of preferred embodiments is merely an example in nature, and is not intended to limit the scope, applications or use of the present disclosure.

First Embodiment

Figure 1:
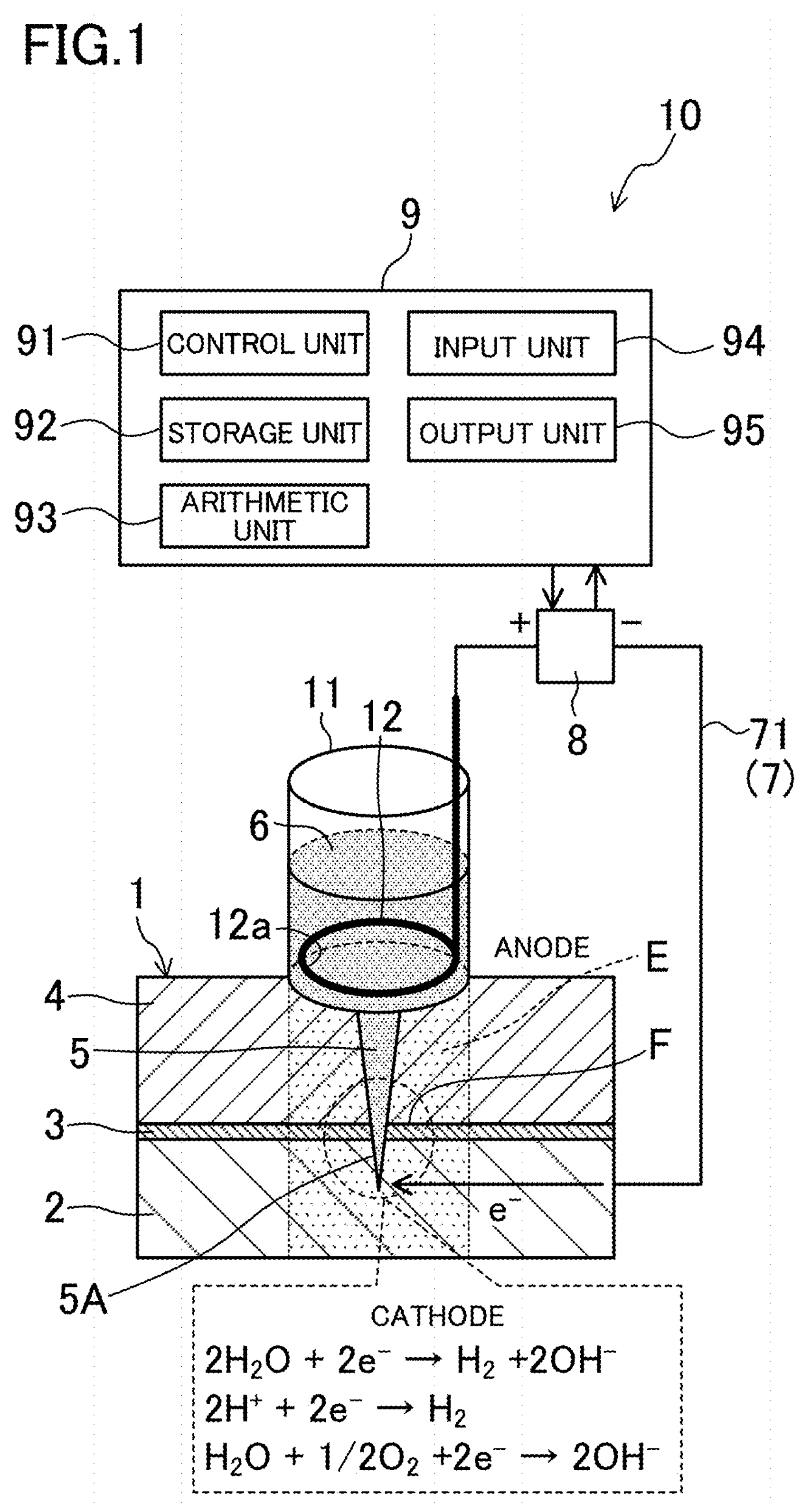
FIG. 1 is a diagram illustrating an example of a corrosion resistance test apparatus according to a first embodiment.

FIG. 1 is a diagram illustrating the principle of a corrosion resistance test method and an example of a corrosion resistance test apparatus according to the present embodiment. In this figure, a reference numeral 1 represents a coated metal material, and a reference numeral 10 represents the corrosion resistance test apparatus.

<Coated Metal Material>

As illustrated in FIG. 1, the coated metal material 1 targeted for a corrosion resistance test according to the present embodiment includes a surface treatment film on a metal base.

The metal base may be, for example, a steel material for forming an electric household appliance, a building material, or an automobile part, such as a cold-rolled steel plate (SPC), a galvanized alloy steel sheet (GA), a high-tensile strength steel sheet, or a hot stamping material, or may be a light alloy material. The metal base is preferably a steel sheet for an automobile member. The metal base may include, on its surface, a chemical conversion coating (e.g., phosphate coating (e.g., zinc phosphate coating) or chromate coating).

A resin coating film is a resin coating film of a resin-based coating material and is preferably an electrodeposition coating film. The coated metal material including the metal base on which the resin coating film is formed as the surface treatment film is suitable as a target for the corrosion resistance test because corrosion is likely to progress during current supply. Specific examples of the resin coating film include cationic electrodeposition coating films (undercoat films) based on an epoxy resin, an acrylic resin, and the like.

The coated metal material may include a multilayer film of two or more layers as the surface treatment film. Specifically, for example, for the surface treatment film being the resin coating film, the coated metal material may be a multilayered coating film obtained by overlaying a topcoat film on an electrodeposition coating film or by overlaying an intermediate coating film and a topcoat film on an electrodeposition coating film.

The intermediate coating film serves to secure reliable finishing and chipping resistance of the coated metal material and to improve adherence between the electrodeposition coating film and the topcoat film. The topcoat film secures reliable color, finishing, and weather resistance of the coated metal material. Specifically, these coating films may be made from, for example, a paint containing: a base resin, such as a polyester resin, an acrylic resin, and an alkyd resin; and a crosslinking agent, such as a melamine resin, a urea resin, and a polyisocyanate compound (including a blocked polyisocyanate compound).

A coated metal material 1 including: a metal base including a steel sheet 2 and a chemical conversion coating 3 on the steel sheet 2; and an electrodeposition coating film 4 (resin coating film) provided as a surface treatment film on the metal base will be described below as an example.

As illustrated in FIG. 1, the coated metal material 1 preferably has at least one damaged portion 5 reaching the steel sheet 2 through the electrodeposition coating film 4 and the chemical conversion coating 3. The damaged portion 5 may be artificially formed or naturally formed. A plurality of damaged portions 5 may be formed apart from each other. In this case, one damaged portion 5 means one of the damaged portions 5.

<Water-Containing Material>

A water-containing material 6 contains water and a supporting electrolyte, and functions as a conductive material. The water-containing material 6 may be a muddy material further containing a clay mineral. For the water-containing material 6 further containing the clay mineral, ions and water in the water-containing material 6 easily permeate through a portion of the electrodeposition coating film 4 around the damaged portion 5 in a holding step S2 and a current supply step S3, which will be described later.

The supporting electrolyte is a salt and is for imparting sufficient electrical conductivity to the water-containing material 6. Specifically, the supporting electrolyte may be at least one salt selected from sodium chloride, sodium sulfate, calcium chloride, calcium phosphate, potassium chloride, potassium nitrate, potassium hydrogen tartrate, and magnesium sulfate. The supporting electrolyte may be particularly preferably at least one salt selected from sodium chloride, sodium sulfate, and calcium chloride. The water-containing material 6 contains the supporting electrolyte preferably at 1 mass % or more to 20 mass % or less, more preferably at 3 mass % or more to 15 mass % or less, particularly preferably at 5 mass % or more to 10 mass % or less.

The clay mineral is for making the water-containing material 6 into the muddy material and promoting movement of ions and permeation of water into the electrodeposition coating film 4 to accelerate progress of corrosion in the current supply step S3. The clay mineral may be a layered silicate mineral or zeolite, for example. The layered silicate mineral may be, for example, at least one selected from kaolinite, montmorillonite, sericite, illite, glauconite, chlorite, and talc. Out of these minerals, kaolinite may be particularly preferably employed. The water-containing material 6 may contain the clay mineral preferably at 1 mass % or more to 70 mass % or less, more preferably at 10 mass % or more to 50 mass % or less, particularly preferably at 20 mass % or more to 30 mass % or less. The water-containing material 6 being the muddy material is allowed to be provided even on a non-horizontal surface of the electrodeposition coating film 4.

The water-containing material 6 may contain an additive in addition to water and the supporting electrolyte or in addition to water, the supporting electrolyte and the clay mineral. Specific examples of the additive include organic solvents such as acetone, ethanol, toluene, and methanol, and substances for improving wettability of the coating film. These organic solvents, substances, and the like can also function to promote permeation of water into the electrodeposition coating film 4. Any of these organic solvents, substances, and the like may be added to the water-containing material 6 as a substitute for the clay mineral. For the water-containing material 6 containing the organic solvent, the content of the organic solvent is preferably 5% or more to 60% or less relative to the content of water in terms of volume ratio. The volume ratio is preferably 10% or more to 40% or less, more preferably 20% or more to 30% or less.

<Corrosion Resistance Test Apparatus for Coated Metal Material>

As illustrated in FIG. 1, a corrosion resistance test apparatus 10 according to the present embodiment includes a container 11, an electrode 12, an external circuit 7, a current supplier 8 (power supply unit, detection unit), and a control device 9 (calculation unit, correction unit, evaluation unit).

<<Container>>

The container 11 is placed on the electrodeposition coating film 4 of the coated metal material 1 through a seal material (not illustrated) for preventing liquid leakage. The water-containing material 6 is in contact with the surface of the electrodeposition coating film 4 at a test target portion E, while being in the container 11.

The container 11 is in a tubular shape such as a cylindrical shape and a polygonal tubular shape, but is not limited thereto. The container 11 may be made from a resin material such as an acrylic resin, an epoxy resin, and aromatic polyether ether ketone (PEEK) or from ceramic, particularly preferably made from a resin material such as an acrylic resin, an epoxy resin, and aromatic polyether ether ketone (PEEK). This allows reduction in the weight and cost of the corrosion resistance test apparatus 10 while securing reliable insulation between the container 11 and the outside.

The seal material is a sheet-shaped seal material made from a silicone resin, for example, and is used to improve adherence between the container 11 and the electrodeposition coating film 4 and fill a gap therebetween when the container 11 is placed on the coated metal material 1. This can effectively reduce leakage of the water-containing material 6 from the gap between the container 11 and the electrodeposition coating film 4. Although the seal material does not have to be provided, it is preferable to provide the seal material in order to sufficiently reduce leakage of the water-containing material 6.

<<Electrode>>

The electrode 12 is for applying a voltage between the steel sheet 2 and the surface of the electrodeposition coating film 4, and is arranged on the side of the electrodeposition coating film 4 of the coated metal material 1. The water-containing material 6 is arranged in contact with both the electrodeposition coating film 4 and the electrode 12 between the electrodeposition coating film 4 and the electrode 12. Specifically, the electrode 12 is provided with its distal end embedded in the water-containing material 6, and is in contact with the water-containing material 6.

An electrode generally used in electrochemical measurement can be used as the electrode 12, and specific examples thereof include a carbon electrode and a platinum electrode.

The shape of the electrode 12 may be a shape generally used in electrochemical measurement, such as a rod shape or a plate shape. Further, for example, a perforated electrode having at least one hole at its distal end may be employed as the electrode 12. For example, in a case where a perforated electrode having a ring-shaped distal end is employed, the perforated electrode may be arranged such that the ring is substantially parallel with the electrodeposition coating film 4. Alternatively, a mesh electrode may be employed as the perforated electrode. The mesh electrode may be arranged substantially parallel with the electrodeposition coating film 4 in a state of the mesh electrode being embedded in the water-containing material 6.

<<External Circuit>>

The external circuit 7 includes a wiring 71 and the current supplier 8 disposed on the wiring 71. The wiring 71 electrically connects the electrode 12 and the steel sheet 2 to each other. The wiring 71 may be of any known type.

<<Current Supply Means>>.

The current supplier 8 is connected to the electrode 12 and the steel sheet 2 by the wiring 71, and serves as a power supply unit that supplies a power, i.e., applies a voltage and/or a current, between the electrode 12 and the steel sheet 2. The current supplier 8 also serves as current detection means/voltage detection means (detection unit) that detects the current and/or the voltage flowing between the electrode 12 and the steel sheet 2 upon application of the voltage and/or the current. Specific examples of the current supplier 8 include a potentiostat/galvanostat that can control an applied voltage/current.

The current supplier 8 is electrically or wirelessly connected to the control device 9 to be described later, and is controlled by the control device 9. Current supply information such as a voltage value, a current value, and current supply time applied from the current supplier 8 to the external circuit 7 or detected by the current supplier 8 are transmitted to the control device 9.

<<Control Device>>

The control device 9 is a device based on, for example, a known microcomputer, and includes a control unit 91, a storage unit 92, and an arithmetic unit 93. The control device 9 further includes an input unit 94 such as a keyboard and an output unit 95 such as a display. The storage unit 92 stores information such as various types of data and arithmetic processing programs.

The arithmetic unit 93 performs various types of arithmetic processing based on the information stored in the storage unit 92, information input with the input unit 94, and the like. That is, the arithmetic unit 93 also functions as a calculation unit that calculates the progress degree of corrosion of the coated metal material 1 that has progressed due to current supply. The arithmetic unit 93 also functions as a correction unit that corrects the progress degree of corrosion based on the posture of the test target portion E. The arithmetic unit 93 also functions as an evaluation unit that evaluates corrosion resistance of the coated metal material 1 based on a correction value for the progress degree of corrosion.

The storage unit 92 stores information on the progress degree of corrosion of the coated metal material 1 and an arithmetic processing result, including the correction value, obtained by the arithmetic unit 93.

The control unit 91 outputs a control signal to a control target to perform various types of control based on the data stored in the storage unit 92, the arithmetic result of the arithmetic unit 93, and the like.

<<Other Configurations>>

Although not illustrated in FIG. 1, in order to heat, and adjust the temperature of, the water-containing material 6, particularly a portion of the water-containing material 6 in the vicinity of the test target portion, a heating and temperature adjustment means, such as a rubber heater or a film heater, may be provided around the container 11 so as to cover the container 11 or on the electrodeposition coating film 4 of the coated metal material 1 outside the container 11. For a similar purpose, a heating and temperature adjustment means, such as a hot plate or a Peltier element, may be provided on the side of the steel sheet 2 of the coated metal material 1. According to this configuration, the water-containing material 6 and the coated metal material 1 can be properly heated and the temperatures thereof can be adjusted, so that it is possible to promote the movement of ions and permeation of water into the electrodeposition coating film 4, which effectively causes corrosion to progress. This allows the corrosion resistance test to be performed in shorter time with higher reliability. Further, the temperatures of the water-containing material 6 and the coated metal material 1 can be kept constant over desired testing time. This allows the corrosion resistance test to be performed under a predetermined temperature condition with higher reliability.

A temperature sensor (temperature detection means) for detecting the temperature of the water-containing material 6 may be provided. Specific examples of the temperature sensor include a thermocouple, a fiber optic thermometer, and an infrared thermometer. In the corrosion resistance test, the temperature of the water-containing material 6, particularly a portion of the water-containing material 6 in the vicinity of the test target portion, is important. Thus, in a case where the temperature sensor is provided, it is preferable to arrange a sensor unit so that it is possible to detect the temperature of the water-containing material 6 in the vicinity of the electrodeposition coating film 4.

Preferably, the heating and temperature adjustment means, the temperature sensor, and the like are electrically or wirelessly connected to the control device 9 and controlled by the control device 9.

A camera may be provided as a device for taking an image of the surface of the coated metal material 1. Examples of the camera include a CCD camera. The camera is electrically or wirelessly connected to the control device 9. An image taken with the camera, i.e., image data, is transmitted to the control device 9. The camera takes an image of the damaged portion 5 before current supply and an image of swelling of the electrodeposition coating film 4 after current supply.

<<Features>>

As will be described in detail later, in the corrosion resistance test apparatus 10, the progress degree of corrosion is corrected by the arithmetic unit 93 based on the posture of the test target portion E. With this configuration, an error in the progress degree of corrosion due to a difference in outgassing of hydrogen gas can be corrected, and therefore, the accuracy and reliability of the corrosion resistance test can be enhanced.

In a case where the test target portion E has the damaged portion 5, the progress of corrosion of the coated metal material 1 appears as swelling of the electrodeposition coating film 4 around the damaged portion 5. In this case, the arithmetic unit 93 calculates the progress degree of corrosion of the coated metal material 1 based on the size of the swelling of the electrodeposition coating film 4. It is possible to evaluate the corrosion resistance accurately in a simple configuration by the calculation of the progress degree of corrosion of the coated metal material based on the size of the swelling of the surface treatment film. Thus, the reliability and versatility of the corrosion resistance test can be improved.

<Corrosion Resistance Test Method for Coated Metal Material>

Figure 2:
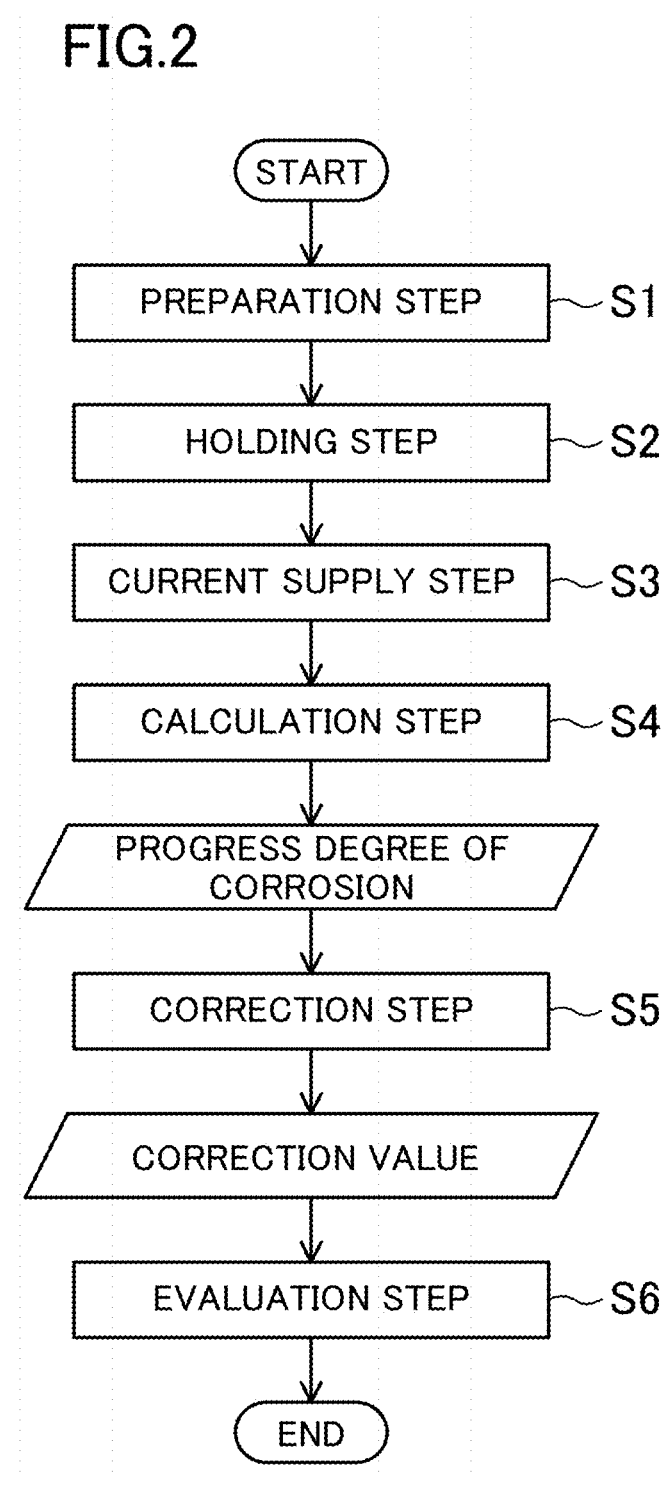
Figure 3A:
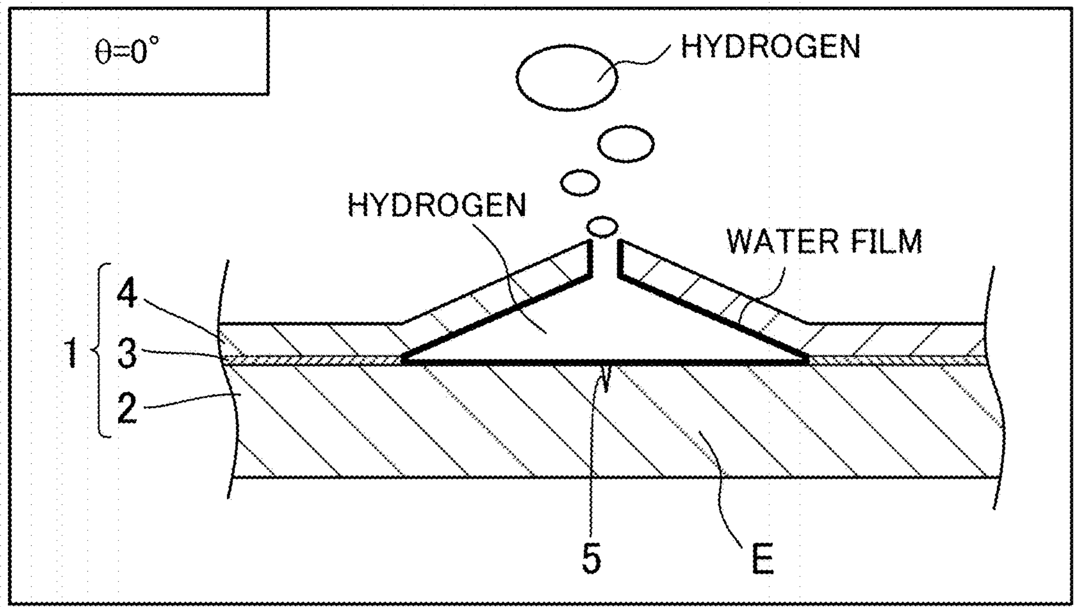
FIGS. 3A to 3C are diagrams for describing a relationship between the posture of a test target portion and outgassing of hydrogen.
Figure 3B:
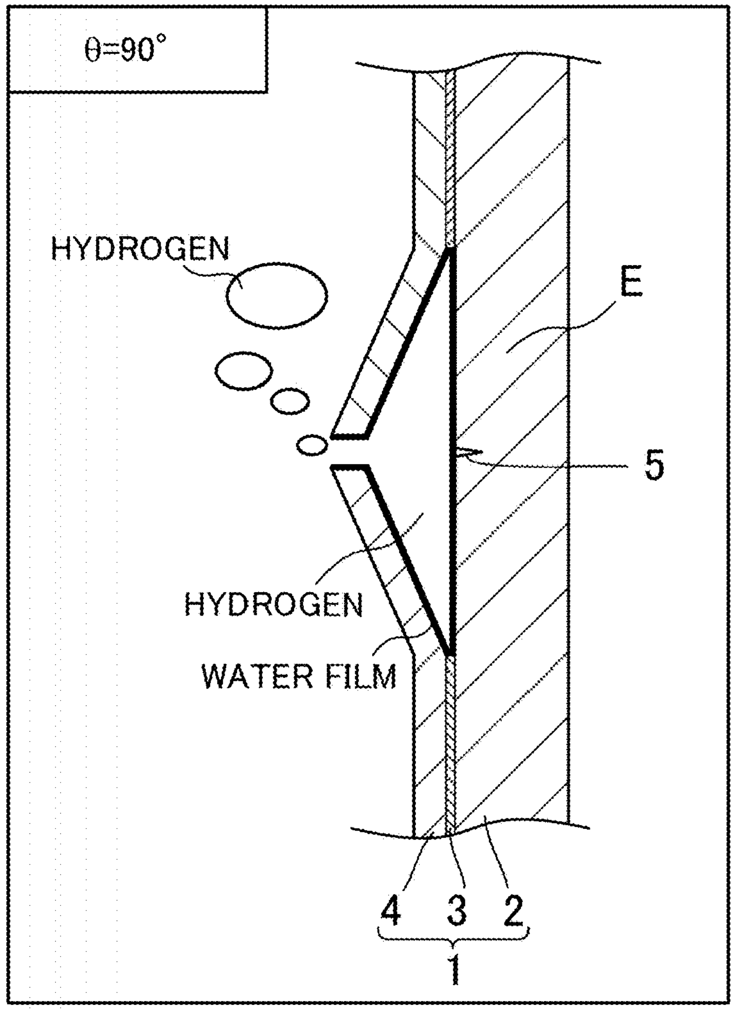
Figure 3C:
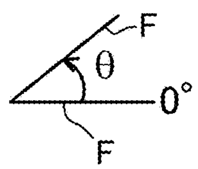
Figure 4:
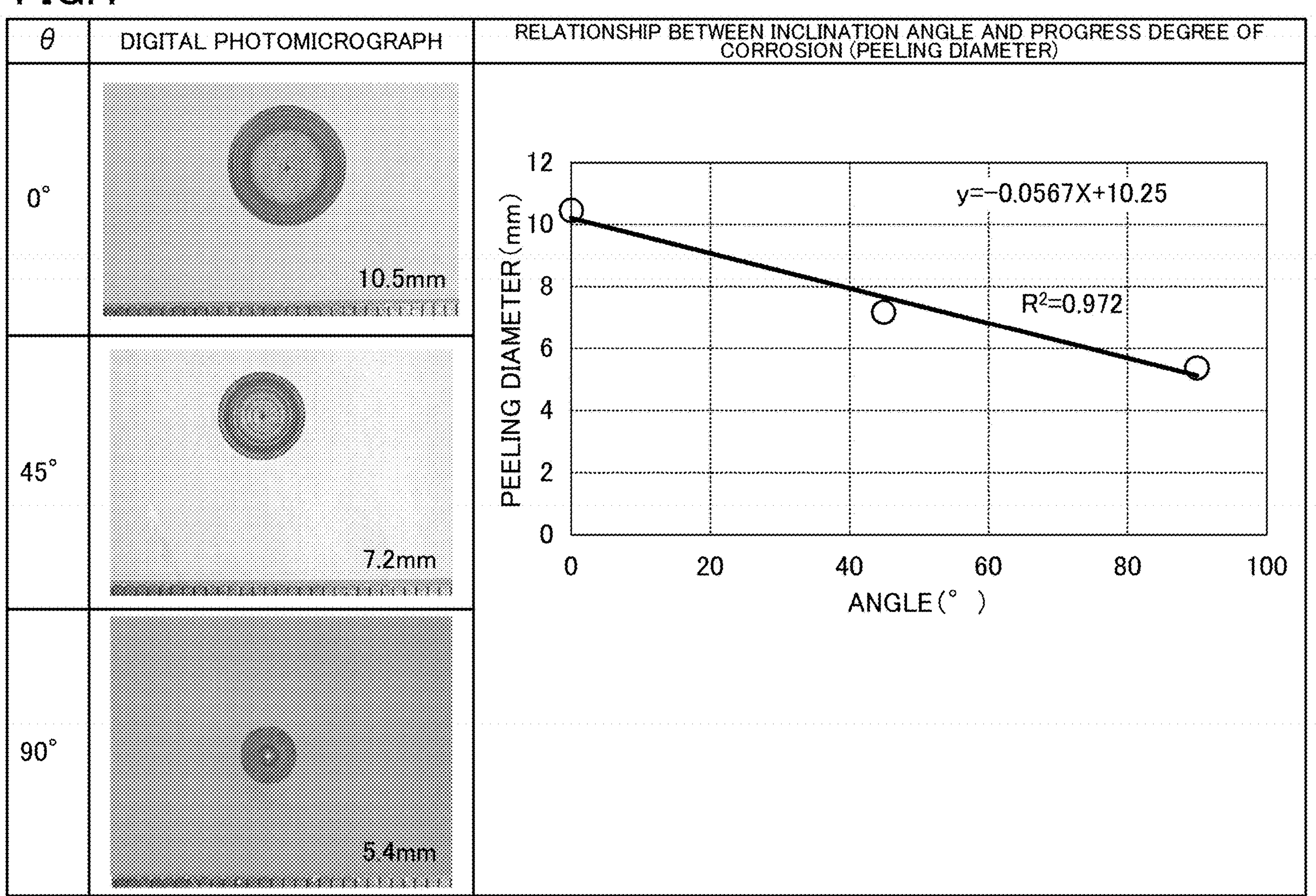
FIG. 4 is a graph illustrating a relationship between an inclination angle and the progress degree of corrosion for a test piece of an experimental example.
Figures 5A, 5B:
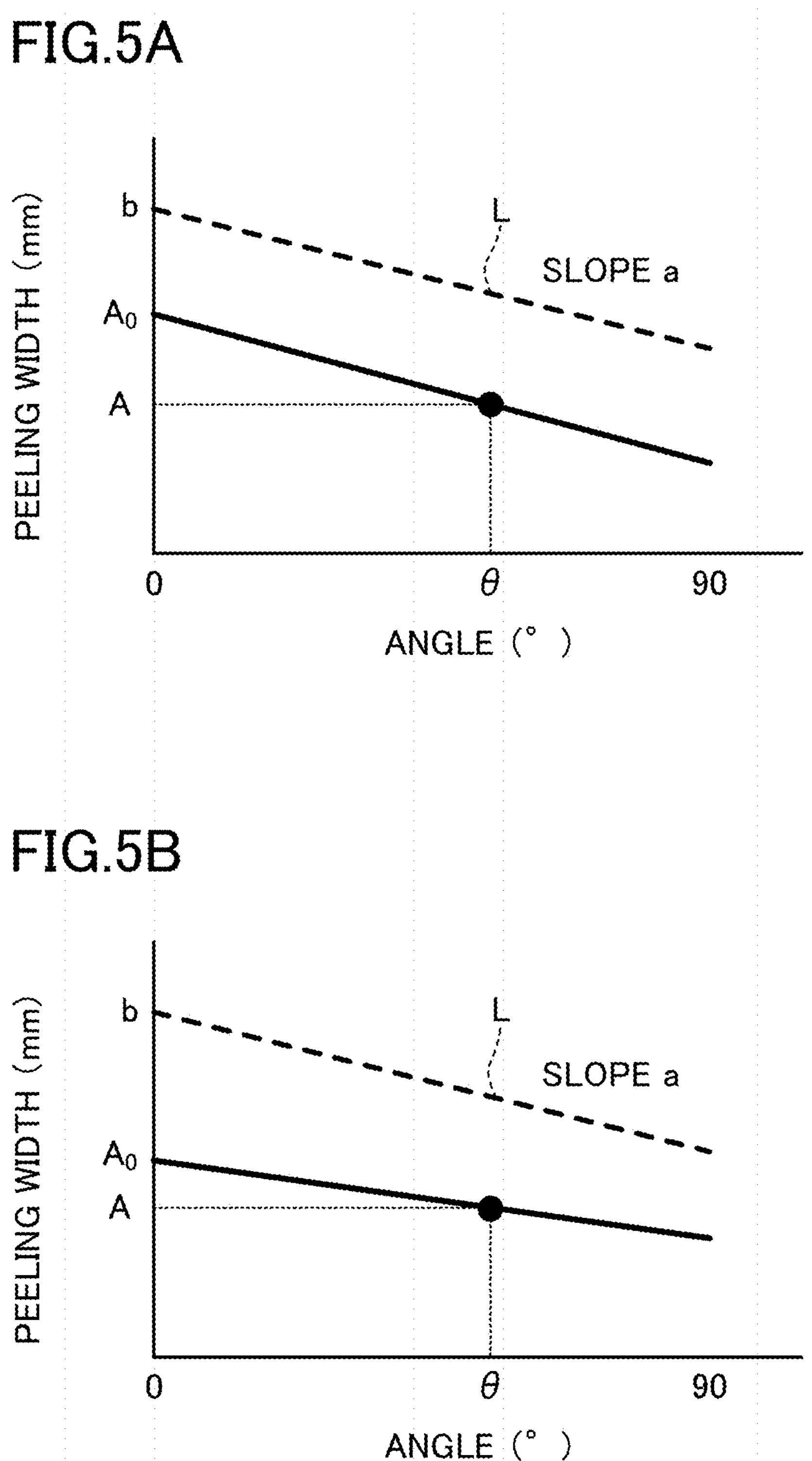
FIG. 5A is a graph for describing an example of a correction method.
FIG. 5B is a graph for describing an example of a correction method.

FIG. 2 is a flowchart of steps of the corrosion resistance test method according to the present embodiment. FIGS. 3A to 3C are diagrams for describing a relationship between the posture of the test target portion and the outgassing of hydrogen. FIG. 4 is a graph illustrating a relationship between an inclination angle and the progress degree of corrosion for a test piece of an experimental example. FIGS. 5A and 5B are graphs for describing examples of correction methods. Hereinafter, the corrosion resistance test method according to the present embodiment will be described with reference to FIGS. 2 to 5B.

As illustrated in FIG. 2, the corrosion resistance test method includes a preparation step S1, an arbitrary holding step S2, a current supply step S3, a calculation step S4, a correction step S5, and an evaluation step S6. These steps will now be described.

<<Preparation Step>>

In the preparation step S1, the coated metal material 1, preferably the coated metal material 1 having one damaged portion 5 reaching the steel sheet 2 through the electrodeposition coating film 4 and the chemical conversion coating 3, is prepared.

The damaged portion 5 of the coated metal material 1 is not necessarily formed, but is preferably formed for the following reasons. That is, if there is the damaged portion 5 reaching the steel sheet 2 through the electrodeposition coating film 4 and the chemical conversion coating 3, the water-containing material 6, when comes into contact with the damaged portion 5, enters the damaged portion 5, and comes into contact with an exposed portion of the steel sheet 2. The damaged portion 5 allows creation of a simulated state at the end of a stage until occurrence of corrosion, i.e., at the end of a corrosion resistance period, out of the process of corrosion of the coated metal material 1. This allows information on a corrosion progress rate to be efficiently obtained in the corrosion resistance test.

As described above, the damaged portion 5 may be a naturally damaged portion or an artificially damaged portion, and preferably an artificially damaged portion. By forming the damaged portion 5 artificially, the damaged portion 5 can be formed in a desired shape, size, and the like to some extent. Thus, the swelling of the electrodeposition coating film 4 progresses easily in the current supply step S3.

The damaged portion 5 may be a dot-shaped damaged portion or a linear damaged portion such as a cut made with a cutter, but is preferably a dot-shaped damaged portion. The "dot shape" indicates a shape, such as a circular shape or a polygonal shape in a plan view, with a ratio between the maximum width and the minimum width of 2 or less. The dot-shaped damaged portion 5 allows the electrodeposition coating film 4 to be swollen effectively in a dome shape in response to corrosion, thereby improving corrosion acceleration.

The artificially damaged portion 5 may be formed with any type of tool. The dot-shaped damaged portion 5 is formed preferably, for example, with an artificially damaging punch or an indenter of a Vickers hardness tester at a predetermined load in order to prevent variations in size and depth of the damaged portion 5, i.e., in order to form the damaged portion 5 quantitatively. For example, the linear damaged portion 5 other than the dot-shaped damaged portion 5 may be formed with a cutter or the like.

The size of the damaged portion 5 is preferably measured in advance. Measurement of the size of the damaged portion 5 is not particularly limited, and can be performed using a publicly known method. Specifically, an image of the periphery of the damaged portion 5 on the surface of the electrodeposition coating film 4 is taken with the camera, for example. The arithmetic unit 93 measures the size, i.e., the diameter, area, and the like, of the damaged portion 5 on the obtained image data.

In a case where the damaged portion 5 is in the dot shape, the diameter of the damaged portion 5 is preferably 0.1 mm or more to 7 mm or less, more preferably 0.2 mm or more to 5 mm or less, particularly preferably 0.3 mm or more to 1.5 mm or less. Regardless of the shape of the damaged portion 5, the area of the damaged portion 5 is preferably 0.01 $mm^2$ or more to 40 $mm^2$ or less, more preferably 0.02 $mm^2$ or more to 20 $mm^2$ or less, particularly preferably 0.05 $mm^2$ or more to 2 $mm^2$ or less.

In the above preferable range, the smaller the diameter or the area, the more the corrosion is accelerated in the current supply step S3. However, when the diameter is reduced to less than 0.1 mm (and/or the area is reduced to less than 0.01 $mm^2$), the electrical conductivity is lowered and cathode reaction is difficult to proceed. On the other hand, the diameter exceeding 7 mm (and/or the area exceeding 40 $mm^2$) causes the cathode reaction to be unstable, and causes the progress of the swelling of the electrodeposition coating film 4 described later to slow down. The size of the damaged portion 5 within the above range accelerates the progress of the cathode reaction and the progress of the swelling of the electrodeposition coating film 4.

Next, in a case where the posture of the test target portion E is represented by an inclination angle θ (see FIG. 3C) from a reference posture of the test target portion, the inclination angle θ is preferably measured in the preparation step S1.

As illustrated in FIG. 3A, the reference posture is preferably, but not limited to, a posture in which the test target portion E is substantially in the horizontal direction in a state in which the coated metal material 1 is arranged with the electrodeposition coating film 4 on the upper side. This posture is a posture with the best outgassing of the hydrogen gas, and therefore, the progress degree of corrosion in this posture is most reliable in evaluating the corrosion resistance of the coated metal material 1. Using this posture as the reference posture, the reliability of the correction value for evaluating the corrosion resistance of the coated metal material is enhanced, and the test accuracy is improved.

Measurement of the inclination angle θ is not particularly limited, and can be performed using publicly known means such as a commercially available angle meter or a protractor.

The container 11, the water-containing material 6, and the electrode 12 are arranged on the side of the electrodeposition coating film 4 of the coated metal material 1. The water-containing material 6 is contained and held in the container 11, and is arranged in contact with the electrodeposition coating film 4, preferably in contact with the damaged portion 5, at the test target portion E of the coated metal material 1. The electrode 12 is arranged in contact with the water-containing material 6.

Specifically, for example, the container 11 is placed first on the surface of the electrodeposition coating film 4 of the test piece of the coated metal material 1 through the seal material, preferably so as to surround the damaged portion 5; and the container 11 is filled with the water-containing material 6. In this manner, the water-containing material 6 is brought into contact with the surface of the electrodeposition coating film 4, preferably with the damaged portion 5. Then, the electrode 12 connected to one end of the wiring 71 is dipped in the water-containing material 6. The other end of the wiring 71 is connected to the steel sheet 2. Accordingly, the electrode 12 and the steel sheet 2 are electrically connected to each other through the external circuit 7.

The container 11 is preferably provided to be concentric with the damaged portion 5. In a case where a perforated electrode is used as the electrode 12, the electrode 12 is preferably provided such that its distal end 12*a* having a hole is parallel with the surface of the electrodeposition coating film 4 and that the electrode 12 is concentric with the damaged portion 5.

<<Holding Step>>

Prior to the subsequent current supply step S3, the holding step S2 of holding the water-containing material 6 for predetermined time with the water-containing material 6 arranged on the surface of the electrodeposition coating film 4 at the test target portion E may be provided. The predetermined time, i.e., holding time, is preferably 1 minute or more to 1 day or less, more preferably 10 minutes or more to 120 minutes or less, particularly preferably 15 minutes or more to 60 minutes or less.

Holding the water-containing material 6 on the surface of the electrodeposition coating film 4 can promote, in advance, permeation of the water-containing material 6 into the electrodeposition coating film 4, particularly movement of ions and permeation of water. This means that the simulated state in which the corrosion resistance period has ended is reproduced in the test target portion E to be closer to an actual corrosion process. Accordingly, corrosion of the coated metal material 1 progresses more smoothly in the subsequent current supply step S3, which can accelerate the progress of the swelling of the electrodeposition coating film 4 for evaluating the corrosion progress rate representing the progress of corrosion. This enables a reduction in the testing time and improvement in the reliability of the corrosion resistance test.

It is preferable in the holding step S2 and the current supply step S3 that the coated metal material 1 and/or the water-containing material 6 are heated and that the temperatures thereof are adjusted. The temperatures of the coated metal material 1 and/or the water-containing material 6 are preferably 30° C. or more to 100° C. or less, more preferably 50° C. or more to 100° C. or less, particularly preferably 50° C. or more to 80° C. or less. This allows acceleration of movement of ions and permeation of water into the electrodeposition coating film 4. Accordingly, the corrosion resistance test can be performed under the predetermined temperature condition with higher reliability.

<<Current Supply Step>>

The current supply step S3 is a step of supplying, with the current supplier 8, a current between the electrode 12 and the steel sheet 2 serving as an anode and a cathode, respectively, as illustrated in FIG. 1 to cause corrosion of the steel sheet 2 to progress, preferably to cause corrosion of the steel sheet 2 to progress around the damaged portion 5.

In response to current supply between the electrode 12 serving as the anode and the steel sheet 2 serving as the cathode, the cathode reaction progresses in a contact portion between the water-containing material 6 and the steel sheet 2, preferably an exposed portion 5A of the steel sheet 2 at the damaged portion 5. Electrolysis of water also progresses and hydrogen is generated, depending on a current supply condition, that is, for example, under a current supply condition where a voltage equal to or higher than a theoretical voltage (1.23 V in a case where a system temperature is 25° C.) at which electrolysis of water occurs to generate hydrogen, or a current requiring such a voltage, is applied.

As the cathode reaction progresses, the electrodeposition coating film 4 swells as described above. Further, hydrogen gas accelerates the swelling of the electrodeposition coating film 4.

The progress of the cathode reaction and the progress of the swelling of the electrodeposition coating film 4, preferably the progress of the cathode reaction and the progress of the swelling of the electrodeposition coating film 4 around the damaged portion 5, are accelerated reproduction of actual corrosion of the coated metal material 1. That is, the progress of the swelling of the electrodeposition coating film 4 is simulated progress of corrosion of the coated metal material 1. In this way, the progress degree of corrosion of the coated metal material 1 can be evaluated by evaluation of the size of the swelling of the electrodeposition coating film 4 at the time when predetermined time has elapsed from the start of current supply. In particular, the rate of increase in the size of the swelling of the electrodeposition coating film 4 corresponds to the corrosion progress rate, out of the process of corrosion of metal described above. Accordingly, the rate of increase in the size of the swelling of the electrodeposition coating film 4, which is obtained as the progress degree of corrosion of the coated metal material 1, allows accurate evaluation of the corrosion resistance related to the corrosion progress rate of the coated metal material 1.

In the current supply step S3, application of the voltage to the water-containing material 6 brings anions (e.g., $Cl^-$) and cations (e.g., $Na^+$) in the water-containing material 6 to move toward the steel sheet 2 through the electrodeposition coating film 4. Water is then drawn with these anions and cations and permeates into the electrodeposition coating film 4.

In a case where the damaged portion 5 is formed, the electrode 12 arranged to surround the damaged portion 5 allows a voltage to be stably applied to the electrodeposition coating film 4 around the damaged portion 5. This leads to efficient movement of ions and efficient permeation of water into the electrodeposition coating film 4 at the time of current supply.

Current supply accelerates movement of ions and permeation of water into the electrodeposition coating film 4 in this manner. Thus, the flow of the current is rapidly stabilized. Accordingly, the progress of the swelling of the electrodeposition coating film 4 is stabilized.

In this manner, the present embodiment allows stable acceleration of the progress of the cathode reaction and the progress of the swelling of the electrodeposition coating film 4. This allows the corrosion resistance test for the coated metal material 1 to be performed accurately in a very short time.

In the current supply step S3, a DC constant current or a constant voltage, preferably a constant current, is preferably applied between the electrode 12 and the steel sheet 2. Corrosion progresses stably by the application of the DC constant current. Accordingly, the reliability of the test can be improved.

The current value in the current supply step S3 is preferably 10 μA or more to 10 mA or less, more preferably 100 μA or more to 5 mA or less, particularly preferably 500 μA or more to 2 mA or less. The current value less than 10 μA reduces accelerated reproducibility of the corrosion, and needs a long period of time for the test. On the other hand, the current value exceeding 10 mA makes the rate of the corrosion reaction unstable, which reduces the correlation with the progress of actual corrosion. Setting the current value within the above range achieves both a reduction in the testing time and an improvement in the reliability of the test.

The current supply time in the current supply step S3 may be, for example, 0.05 hours or more to 24 hours or less, preferably 0.1 hours or more to 10 hours or less, more preferably 0.1 hours or more to 5 hours or less, in order to shorten the testing time while obtaining the sufficient size of the swelling of the coating film. The time for the holding step S2 may be preferably 0.1 hours or more to 1 hour or less.

<<Calculation Step>>

In the calculation step S4, the progress degree of corrosion of the coated metal material 1 in the current supply step S3 is calculated.

As described above, checking how much the electrodeposition coating film 4 is swollen at the time when the predetermined time has elapsed since the start of current supply in the current supply step S3 allows the progress degree of corrosion of the coated metal material 1 to be obtained.

An index representing the progress degree of corrosion includes, for example, the size of the swelling of the electrodeposition coating film 4 (in a case where no damaged portion 5 is formed or a case where the size of the damaged portion 5 is significantly small), a difference between the size of the damaged portion 5 before current supply and the size of the swelling of the electrodeposition coating film 4 after the current supply, and the progress rate of the swelling of the electrodeposition coating film 4 obtained by dividing the difference by the current supply time. Preferably, the index representing the progress degree of corrosion is the progress rate of the swelling of the electrodeposition coating film 4. This is because the progress rate of the swelling of the electrodeposition coating film 4 corresponds to the corrosion progress rate.

The size of the swelling of the electrodeposition coating film 4 can be measured by a method similar to that for the size of the damaged portion 5.

In a case where the diameter of the damaged portion 5 is measured as the size of the damaged portion 5 in the preparation step S1, the size of the swelling of the electrodeposition coating film 4 is obtained by measuring, for example, the diameter ("swelling diameter") of a circle appeared around the damaged portion 5 due to the swelling of the electrodeposition coating film 4. Preferably, for measurement of the size of the swelling of the electrodeposition coating film 4, an adhesive tape may be bonded to the electrodeposition coating film 4 after the corrosion resistance test to peel the swollen portion of the electrodeposition coating film 4, and the diameter of the exposed surface of the steel sheet 2 ("peeling diameter") may be measured.

Specifically, an image of the periphery of the damaged portion 5 after peeling is taken with the camera, for example. The arithmetic unit 93 can measure the swelling diameter or the peeling diameter on the obtained image data.

In a case where the surface area of the damaged portion 5 is measured as the size of the damaged portion 5 in the preparation step S1, the surface area may also be employed as the size of the swelling of the electrodeposition coating film 4.

The progress rate of the swelling of the electrodeposition coating film 4 is calculated as follows as the progress degree of corrosion, for example. The area, distance, or the like of a region of the electrodeposition coating film 4 where the swelling has progressed during current supply is calculated based on the area or diameter of the damaged portion 5, a swelling area or a peeling area, or the swelling diameter or the peeling diameter. Based on the area or distance of the region where the swelling has progressed and on the current supply time in the current supply step S3, the progress rate of the swelling of the electrodeposition coating film 4 is calculated.

It is therefore possible to evaluate the progress degree of corrosion of the coated metal material accurately. Thus, the reliability and versatility of the corrosion resistance test can be improved.

<<Correction Step>>

Next, in the correction step S5, the progress degree of corrosion obtained in the calculation step S4 is corrected based on the posture of the test target portion E.

As described above, the progress degree of corrosion in the current supply step S3 is expected to vary depending on the posture of the test target portion E. Specifically, as illustrated in FIGS. 3A and 3B, for example, the outgassing of hydrogen in the current supply step S3 is considered different between a case where the inclination angle θ is 0° (FIG. 3A) and a case where the inclination angle θ is 90° (FIG. 3B).

Experimental Examples

An experiment was conducted to verify the above hypothesis.

First, a test piece (also referred to as "TP") to be used in the corrosion resistance test of the experimental example was produced.

The specifications of the coated metal material 1 are as follows. That is, a zinc phosphate coating as the chemical conversion coating 3 was formed on the surface of an SPC as the flat steel sheet 2, and the thus obtained product was used as the metal base. Chemical conversion treatment time for forming the zinc phosphate coating was 120 seconds. An electrodeposition coating film 4 made of an epoxy-based resin was formed as the surface treatment film. Electrodeposition baking conditions were 140°×15 minutes, and the thickness of the electrodeposition coating film 4 was about 10 μm.

The damaged portion 5 was artificially formed in the surface of the TP where the electrodeposition coating film 4 is formed, using a Vickers hardness tester with a load of 30 kg. The size of the damaged portion 5 before current supply was 0.8 mm to 0.9 mm.

The inclination angle θ of the TP was set to three types, that is, 0°, 45°, and 90°, and the corrosion resistance test was performed using the apparatus illustrated in FIG. 1. Specifically, the TP was maintained in a static condition for 30 minutes in the environment where the temperature of the water-containing material 6 was 65° C., and then, a constant current of 1 mA was applied at the same temperature for 30 minutes. The water-containing material 6 used was simulated mud (composition: water, 1.2 L; kaolinite, 1 kg; sodium sulfate, 50 g; sodium chloride, 50 g; calcium chloride, 50 g).

Thereafter, the simulated mud was removed, and the surface of the TP was cleaned. After that, the swollen portion of the electrodeposition coating film 4 was removed with the adhesive tape, and the peeling diameter was measured.

FIG. 4 shows digital photomicrographs of the surfaces of the TPs after peeling and a graph in which the peeling diameter is plotted with respect to the inclination angle θ.

As shown in FIG. 4, it was found that the peeling diameter decreases proportionally as the inclination angle θ increases in the order of 0°, 45°, and 90°. As described above, the present experiment shows that the progress degree of corrosion varies depending on the posture of the test target portion E.

From the graph in FIG. 4, an expression y=ax+b (where a=−0.0567, b=10.25) shown in FIG. 4 was obtained through calculation of the expression for the approximate straight line L. This expression shows a correlation between the inclination angle θ and the progress degree of corrosion. It is conceivable to correct the progress degree of corrosion obtained in the current supply step S3 using this expression.

Example of Correction Method

That is, the progress degree of corrosion may be corrected based on the correlation, experimentally obtained in advance (e.g., the expression shown in FIG. 4), between the inclination angle θ and the progress degree of corrosion, and on the inclination angle θ of the test target portion E of the coated metal material 1 measured in the preparation step S1.

According to this configuration, since the progress degree of corrosion is corrected based on the correlation obtained in advance, the corrosion resistance test can be performed with high reliability by a simple configuration.

Specifically, the graph of FIG. 4 shows that there is the correlation between the inclination angle θ and the progress degree of corrosion, in which the progress degree of corrosion decreases in proportion to the inclination angle. This correlation is represented by y=ax+b (where a<0, b>0).

An example of the correction method is a method of correcting the progress degree of the corrosion based on Expression (1) below, as shown in FIG. 5A.

$$A_0 = A + a\theta \tag{1}$$

In Expression (1), $A_0$ is the correction value, A is the measurement value of the progress degree of corrosion, a is the slope of the correlation, and θ is the inclination angle (0°≤θ≤90°).

In this configuration, the measurement values A of the progress degree of corrosion measured at various inclination angles θ are corrected to the value $A_0$ of the reference posture (θ=0°) using the slope a of the correlation obtained experimentally in advance. As shown in FIG. 5A, the slope a is used as it is, as a correction coefficient. According to this configuration, the progress degree of corrosion can be corrected accurately using a simple expression.

Another example of the correction method is a method of correcting the progress degree of corrosion based on Expression (2) below, as shown in FIG. 5B.

$$A_0 = A / [1 - (a/b)] \times \theta \tag{2}$$

In Expression (2), $A_0$ is the correction value, A is the progress degree of corrosion, a is the slope of the correlation, b is the intercept of the correlation, and θ is the inclination angle (0°≤θ≤90°).

In this configuration, the measurement values A of the progress degree of corrosion measured at various inclination angles θ are corrected to the value $A_0$ of the reference posture (θ=0°) using both the slope a and the intercept b of the correlation obtained experimentally in advance.

According to this configuration, the progress degree of corrosion can be corrected accurately because correction is made in consideration of the intercept of the correlation as well. In addition, in Expression (1), if the measurement value A is extremely small, the correction value could be a negative value depending on the setting of the reference posture. Even in such a case, an appropriate correction value is obtainable according to Expression (2).

The correction step S5 is provided to correct the progress degree of corrosion based on the posture of the test target portion E as described above. With this configuration, the error in the progress degree of corrosion due to the difference in the outgassing of hydrogen gas can be corrected, and therefore, the accuracy and reliability of the corrosion resistance test can be enhanced.

The correlation, particularly the values of a and b, may vary depending on the specifications of the coated metal material 1, the conditions for the corrosion resistance test, and the like. The above correlation under various conditions may be experimentally obtained in advance and stored in the storage unit 92.

<<Evaluation Step>>

The evaluation step S6 is a step of evaluating the corrosion resistance of the coated metal material 1 based on the correction value for the progress degree of corrosion obtained in the correction step S5.

The correction value can be used to evaluate the corrosion resistance of the coated metal material 1 in connection with the actual corrosion test, for example. Specifically, for example, a relationship between the correction value for the progress degree of corrosion obtained in the corrosion resistance test and the corrosion progress rate obtained in the actual corrosion test is obtained in advance, which makes it possible to check which degree of corrosion resistance in the actual corrosion test the result of the corrosion resistance test corresponds to.

<Corrosion Resistance Test Program and Recording Medium for the Corrosion Resistance Test Program>

At least some of the steps of the corrosion resistance test method described above are programmed as a corrosion resistance test program. Specifically, the corrosion resistance test program according to the present embodiment is a program that causes a computer to execute at least the processes of the correction step S5, preferably the processes of the current supply step S3, the processes of the calculation step S4, the processes of the correction step S5, and the processes of the evaluation step S6, among the above-described steps. The corrosion resistance test program can be executed by the control unit 91 and the arithmetic unit 93 while being stored in the storage unit 92. The corrosion resistance test program is not limited to being stored in the storage unit 92, and may be recorded in various types of known computer-readable recording media, such as an optical disk medium and a magnetic tape medium. The recording medium is attached to a reading device (not shown) of the control device 9, and the corrosion resistance test program is read out, thereby making it possible to execute the program.

According to this configuration, the highly reliable corrosion resistance test can be performed by the computer executing the processes of the correction step S5.

Second Embodiment

Hereinafter, other embodiments according to the present disclosure will be described in detail. In the description of these embodiments, the same reference characters as those in the first embodiment are used to represent equivalent elements, and the detailed explanation thereof will be omitted.

The container 11 for use in the corrosion resistance test apparatus 10 is not limited to the configuration of the container of the first embodiment. For example, the container 11 illustrated in FIGS. 6 to 10 can be suitably used in the corrosion resistance test.

Figure 6:
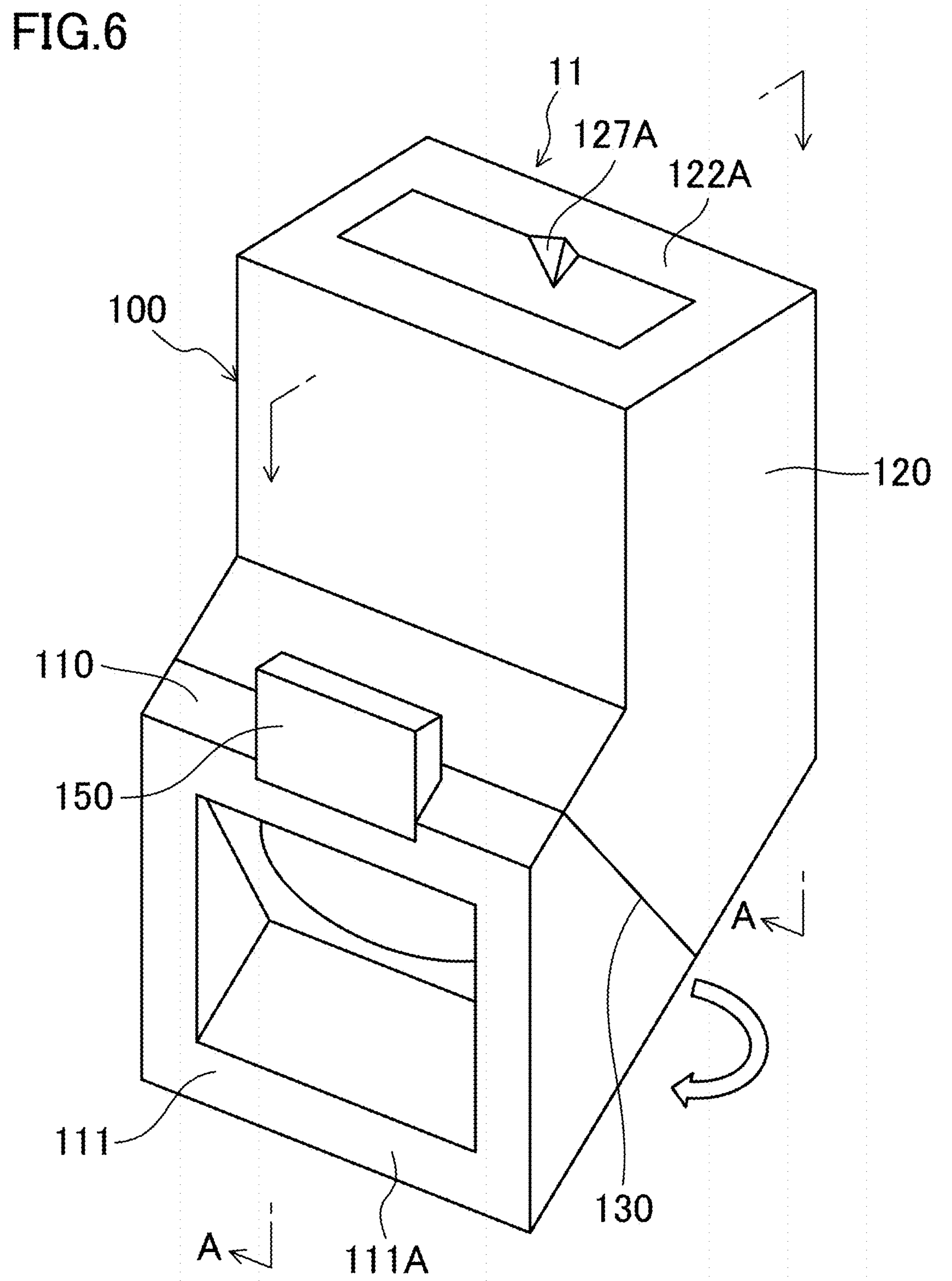
FIG. 6 is a diagram illustrating an example of a container of a corrosion resistance test apparatus according to a second embodiment.
Figure 7:
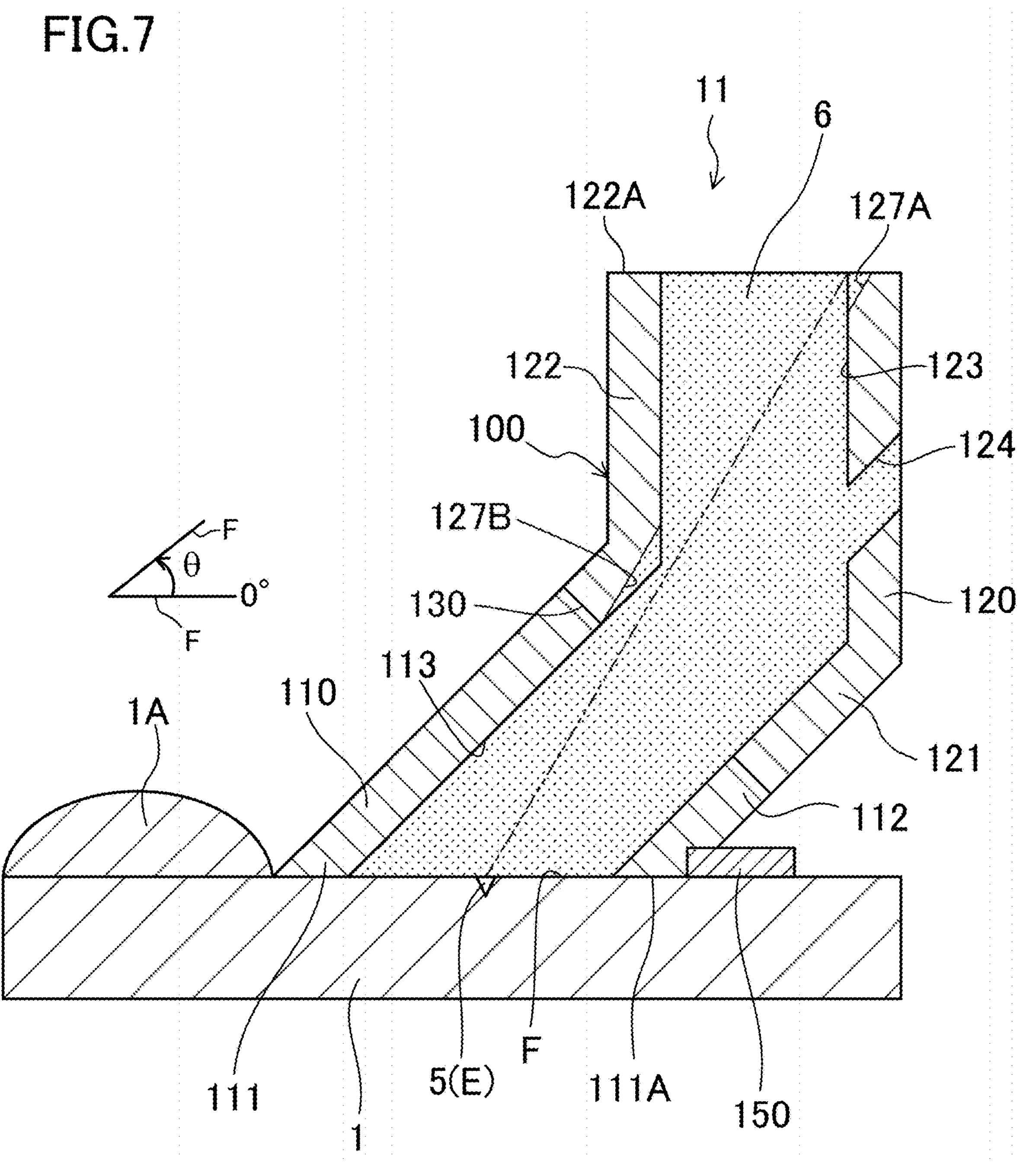
FIG. 7 is a sectional view of the container of the corrosion resistance test apparatus of FIG. 6 taken along line A-A, illustrating the container placed on a coated metal material, at which a test target portion is in a reference posture.
Figure 8:
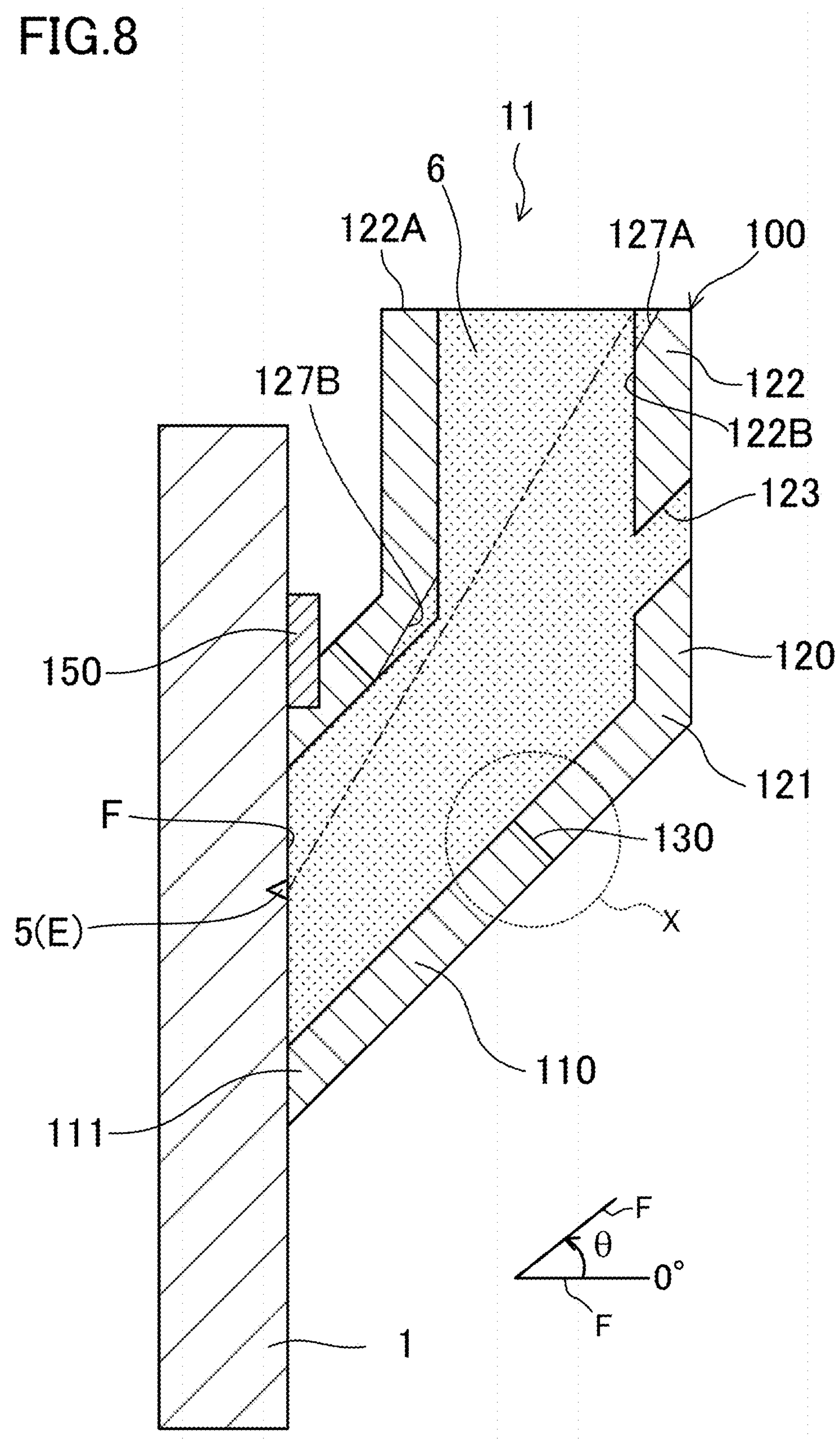
FIG. 8 is a sectional view of the container of the corrosion resistance test apparatus of FIG. 6 taken along line A-A, illustrating the container placed on the coated metal material, at which the test target portion is in a posture with an inclination angle of 90°.

As illustrated in FIGS. 6 to 8, the container 11 includes a tubular container body 100 and an angle meter 150 (posture measurement means).

<<Container Body>>

The container body 100 can hold therein the water-containing material 6 by being placed on the side of the electrodeposition coating film 4 of the coated metal material 1. In the container 11 illustrated in FIGS. 6 to 10, the container body 100 has a rectangular tubular shape, but is not limited thereto as long as the shape is a tubular shape. The container body 100 may be in a cylindrical shape as in the first embodiment, or may be in another shape such as a polygonal tubular shape.

The container body 100 includes a first tubular portion 110 whose proximal end portion 111 is brought into contact with the electrodeposition coating film 4, and a second tubular portion 120 that is connected to a distal end portion 112 of the first tubular portion 110 through a connection portion 130.

The second tubular portion 120 has a proximal end portion 121 arranged at the distal end portion 112 of the first tubular portion 110, and a distal end portion 122 arranged at the proximal end portion 121 so as to extend toward opposite to the first tubular portion 110 and inclined at a predetermined angle with respect to the proximal end portion 121.

An inner circumferential portion 123 of the second tubular portion 120 communicates with an inner circumferential portion 113 of the first tubular portion 110.

A through hole 124 is provided in a side wall of the distal end portion 122 of the second tubular portion 120. The through hole 124 is provided for releasing an internal pressure to keep the internal pressure of the container body 100 from rising too much due to, e.g., hydrogen gas generated during the test or a volatile component of the water-containing material, for injecting the water-containing material 6, for drawing out the electrode 12 or the wiring 71 of the external circuit 7, and the like. As illustrated in FIGS. 7 and 8, in a case where the container body 100 is filled with the water-containing material 6 and the distal end surface 122A of the second tubular portion 120 is not closed with a lid, the through hole 124 may be closed with a plug or the like.

As indicated by a white arrow in FIG. 6, the second tubular portion 120 is connected to the first tubular portion 110 by the connection portion 130 so as to be rotatable in the circumferential direction of the first tubular portion 110.

It is possible to make the distal end portion 122 of the second tubular portion 120 always face upward in the vertical direction by rotating the second tubular portion 120 with respect to the first tubular portion 110 depending on the posture of the test target portion. This can reduce leakage of the water-containing material in the container body from the container body.

In the example of the container 11 illustrated in FIGS. 6 to 8, the first tubular portion 110 and at least the proximal end portion 121 of the second tubular portion 120 are provided coaxially. Thus, when the second tubular portion 120 is rotated in the circumferential direction of the first tubular portion 110, at least the proximal end portion 121 of the second tubular portion 120 rotates in the circumferential direction of the proximal end portion 121.

In the example of the container 11 illustrated in FIGS. 6 to 8, the second tubular portion 120 can only be in either one of a state in which the second tubular portion 120 is not rotated in the circumferential direction of the first tubular portion 110 (FIG. 7) or a state in which the second tubular portion 120 is rotated by 180° (FIGS. 6 and 8), considering sealability.

FIG. 7 illustrates a case where the container 11 of the present embodiment is placed on the test piece of the coated metal material 1 in which the posture of the test target portion is horizontal that is the reference posture.

As illustrated in FIG. 7, the container 11 is placed on the test piece such that the proximal end surface 111A of the first tubular portion 110 is in contact with the electrodeposition coating film 4. The distal end portion 122 of the second tubular portion 120 is arranged so as to extend upward in the vertical direction. This can reduce leakage of the water-containing material 6 from the container body 100.

The test piece illustrated in FIG. 7 has a welded portion 1A. If the container 11 of the present embodiment is employed, the container 11 and the water-containing material 6 can be placed easily and stably, even if the welded portion 1A or the like is present and it is difficult to place a tubular container extending in one direction such as the container 11 of the first embodiment.

FIG. 8 illustrates a case where the container 11 of the present embodiment is placed on the test piece of the coated metal material 1 in which the posture of the test target portion, i.e., the inclination angle θ with respect to the horizontal direction, is 90°.

In a case where the inclination angle θ of the test target portion is 90° as in FIG. 8, the second tubular portion 120 is rotated by 180° in the circumferential direction of the first tubular portion 110 from the state of FIG. 7, thereby making it possible to make the distal end surface 122A of the second tubular portion 120 face upward in the vertical direction. Since the distal end surface 122A faces upward even if the inclination angle θ of the test target portion is 90°, it is possible to reduce the leakage of the water-containing material 6 effectively.

The connection portion 130 may have any configuration as long as the second tubular portion 120 is rotatable in the circumferential direction of the first tubular portion 110 with respect to the first tubular portion 110 to reduce the leakage of the water-containing material 6 from the inside to the outside.

Figure 9A:
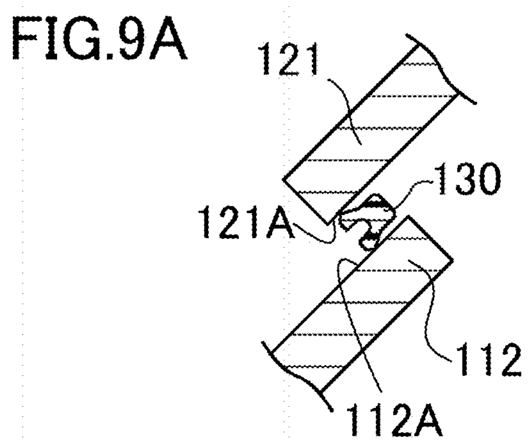
FIG. 9A is a diagram of the container of the corrosion resistance test apparatus of FIG. 6, viewed from a distal end surface side of a second tubular portion.
Figure 9B:
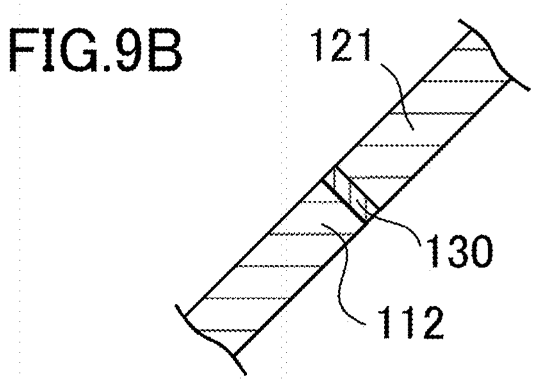
FIG. 9B is a diagram of the container of the corrosion resistance test apparatus of FIG. 6, viewed from a distal end surface side of a second tubular portion.
Figure 9C:
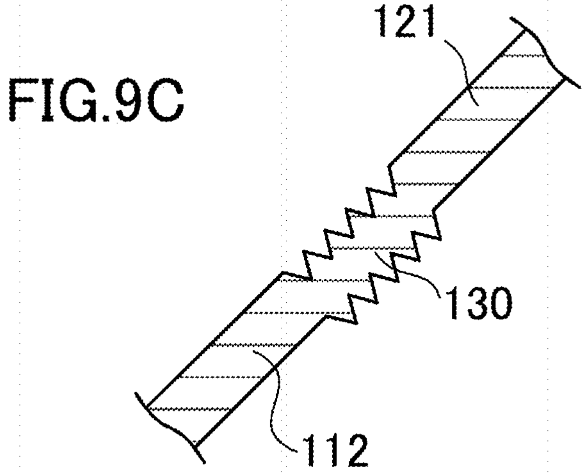
FIG. 9C is a diagram of the container of the corrosion resistance test apparatus of FIG. 6, viewed from a distal end surface side of a second tubular portion.

FIGS. 9A to 9C illustrate specific examples of the configuration of the connection portion 130.

The connection portion 130 may have a configuration including, for example, an annular seal member. FIG. 9A illustrates an example where the connection portion 130 is configured as an annular seal member.

As illustrated in FIG. 9A, for example, the outer diameter of the proximal end portion 121 of the second tubular portion 120 may be smaller than the inner diameter of the distal end portion 112 of the first tubular portion 110.

The connection portion 130 may have a configuration including the annular seal member arranged between the outer circumferential surface 121A of the proximal end portion 121 of the second tubular portion 120 and the inner circumferential surface 112A of the distal end portion 112 of the first tubular portion 110 so as to be in contact with both of these circumferential surfaces.

Specific examples of the annular seal member include a lip packing having a flexible lip structure. Examples of the lip packing include a U packing, a V packing, and a Y packing, among which a U packing is preferable.

The connection portion 130 having a configuration including the annular seal member allows the second tubular portion 120 to rotate smoothly in the circumferential direction of the first tubular portion 110 and effectively keeps the water-containing material 6 from leaking from the inside to the outside.

As illustrated in FIG. 9B, the connection portion 130 may have a configuration including a magnet. In FIG. 9B, the distal end surface 112B of the distal end portion 112 of the first tubular portion 110 and the proximal end surface 121B of the proximal end portion 121 of the second tubular portion 120 are detachable from each other by a magnet. A specific example of this case may be, for example, that a magnet is fixed to one of the distal end surface 112B or the proximal end surface 121B with an adhesive agent or through resin molding, for example, and that a metal plate or the like may be fixed to the other one of the distal end surface 112B or the proximal end surface 121B with an adhesive agent or through resin molding, for example, so that the magnet and the metal plate are detachable from each other.

According to this configuration, since the first tubular portion 110 and the second tubular portion 120 are detachable from each other by the magnet, the second tubular portion 120 can be fixed at a position rotated by a desired angle in the circumferential direction of the first tubular portion 110. Thus, the versatility of the apparatus is improved.

Further, as illustrated in FIG. 9C, the connection portion 130 may have a bellows structure. This configuration allows the second tubular portion 120 to be oriented in various directions with respect to the first tubular portion 110. This configuration improves the degree of flexibility of the test piece to be tested and therefore improves the versatility of the apparatus. Further, since the first tubular portion 110 and the second tubular portion 120 can be integrally formed, it is possible to effectively keep the water-containing material 6 from leaking.

As illustrated in FIGS. 6 to 8 and 10, the distal end portion 122 of the second tubular portion 120 has a first cutout 127A provided for observing the test target portion. The first cutout 127A is provided from the distal end surface 122A to the inner circumferential surface 122B of the distal end portion 122.

A second cutout 127B for observing the test target portion is provided in the inner circumferential surface of a coupling portion between the proximal end portion 121 and the distal end portion 122 of the second tubular portion 120. The second cutout 127B is provided so as to extend in the axial direction of the proximal end portion 121 and the distal end portion 122.

Figure 10:
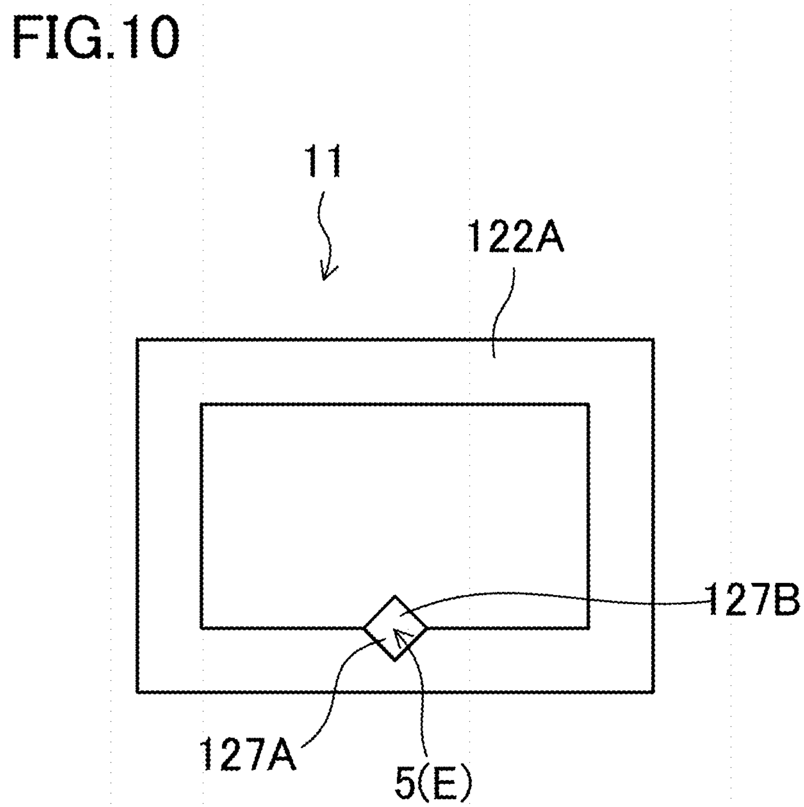
FIG. 10 is a diagram illustrating a configuration example of a connection portion of the container of FIG. 6.

Particularly, as illustrated in FIG. 10, the radial cross sections of the first cutout 127A and the second cutout 127B are in a triangular shape, but are not limited thereto and may be in a circular shape, other polygonal shapes, or the like.

As illustrated in FIGS. 7, 8, and 10, the first cutout 127A and the second cutout 127B form an observation window, preferably a rectangular observation window, when the inside of the container body 100 is observed from the distal end surface 122A of the distal end portion 122. It is thus possible to observe the test target portion E, particularly the portion where the damaged portion 5 is provided, through the observation window in observing the inside of the container body from the outside of the container body (from the distal end surface of the distal end portion) as indicated by a two-dot-dash line in FIGS. 7 and 8. In FIG. 10, the shape of the observation window is rectangular, but is not limited thereto and may be another shape such as a circular shape, an oval shape, and a polygonal shape.

<<Angle Meter>>

The angle meter 150 is attached to the container body 100 and measures the posture of the coated metal material 1, preferably the inclination angle θ with respect to the reference posture. The angle meter 150 is attached to the distal end portion 112 side of the first tubular portion 110. This configuration allows the angle meter 150 to be located on the electrodeposition coating film 4 in the vicinity of the test target portion when the container body 100 is placed on the electrodeposition coating film 4 of the coated metal material 1. Thus, the inclination angle θ of the test target portion with respect to the reference posture can be measured by the angle meter 150 (precisely, the inclination angle of the vicinity of the test target portion is measured; but such a portion is sufficiently close to the test target portion, and therefore, the inclination angle can be approximated to the inclination angle θ of the measurement target portion).

According to this configuration, the inclination angle can be automatically measured by simply placing the container 11 on the test piece, thereby making it possible to simplify the steps of the corrosion resistance test.

<<Features>>

In summary, the container 11 for use in the corrosion resistance test apparatus 10 according to the second embodiment has the following features.

The container includes the tubular container body that can hold therein the water-containing material by being placed on the surface treatment film of the coated metal material, and the posture measurement means (angle meter) attached to the container body to measure the posture of the coated metal material, preferably the inclination angle with respect to the reference posture.

The container body includes the first tubular portion whose proximal end side is brought into contact with the surface treatment film, and the second tubular portion extending from the distal end side of the first tubular portion.

The inner circumferential portion of the second tubular portion communicates with the inner circumferential portion of the first tubular portion.

The second tubular portion has the proximal end portion arranged at the distal end side of the first tubular portion, and the distal end portion arranged at the proximal end portion so as to extend toward opposite to the first tubular portion and inclined at the predetermined angle with respect to the proximal end portion.

The second tubular portion is connected to the first tubular portion so as to be rotatable in the circumferential direction of the first tubular portion. It is possible to make the distal end portion of the second tubular portion always face upward in the vertical direction by rotating the second tubular portion with respect to the first tubular portion depending on the posture of the test target portion. This can reduce leakage of the water-containing material in the container body from the container body.

The first tubular portion and at least the proximal end portion of the second tubular portion are provided coaxially.

When the second tubular portion is rotated in the circumferential direction of the first tubular portion, at least the proximal end portion of the second tubular portion rotates in the circumferential direction of the proximal end portion.

The second tubular portion is connected to the first tubular portion through the connection portion.

The outer diameter of the proximal end portion of the second tubular portion may be smaller than the inner diameter of the distal end portion of the first tubular portion.

The connection portion may include the annular seal member arranged between the outer circumferential surface of the proximal end portion of the second tubular portion and the inner circumferential surface of the distal end portion of the first tubular portion so as to be in contact with both of these circumferential surfaces, preferably the lip packing having the flexible lip structure, more preferably the U packing.

The connection portion may include the magnet.

The connection portion may have the bellows structure.

The distal end portion of the second tubular portion has the first cutout provided for observing the test target portion. The first cutout is provided from the distal end surface to the inner circumferential surface of the distal end portion of the second tubular portion.

The second cutout for observing the test target portion is provided in the inner circumferential surface of the coupling portion between the proximal end portion and the distal end portion of the second tubular portion. The second cutout is provided so as to extend in the axial direction of the proximal end portion and the distal end portion of the second tubular portion.

The first cutout and the second cutout form an observation window, preferably a rectangular observation window, when the inside of the container body is observed from the distal end surface of the distal end portion of the second tubular portion. It is thus possible to observe the test target portion, particularly the portion where the damaged portion 5 is provided, through the observation window in observing the inside of the container body from the outside of the container body (from the distal end surface of the distal end portion).

Third Embodiment

In the first and second embodiments, the test method of supplying a current between the electrode 12 and the steel sheet 2 has been described as an example, but the method is not limited thereto.

Figure 11:
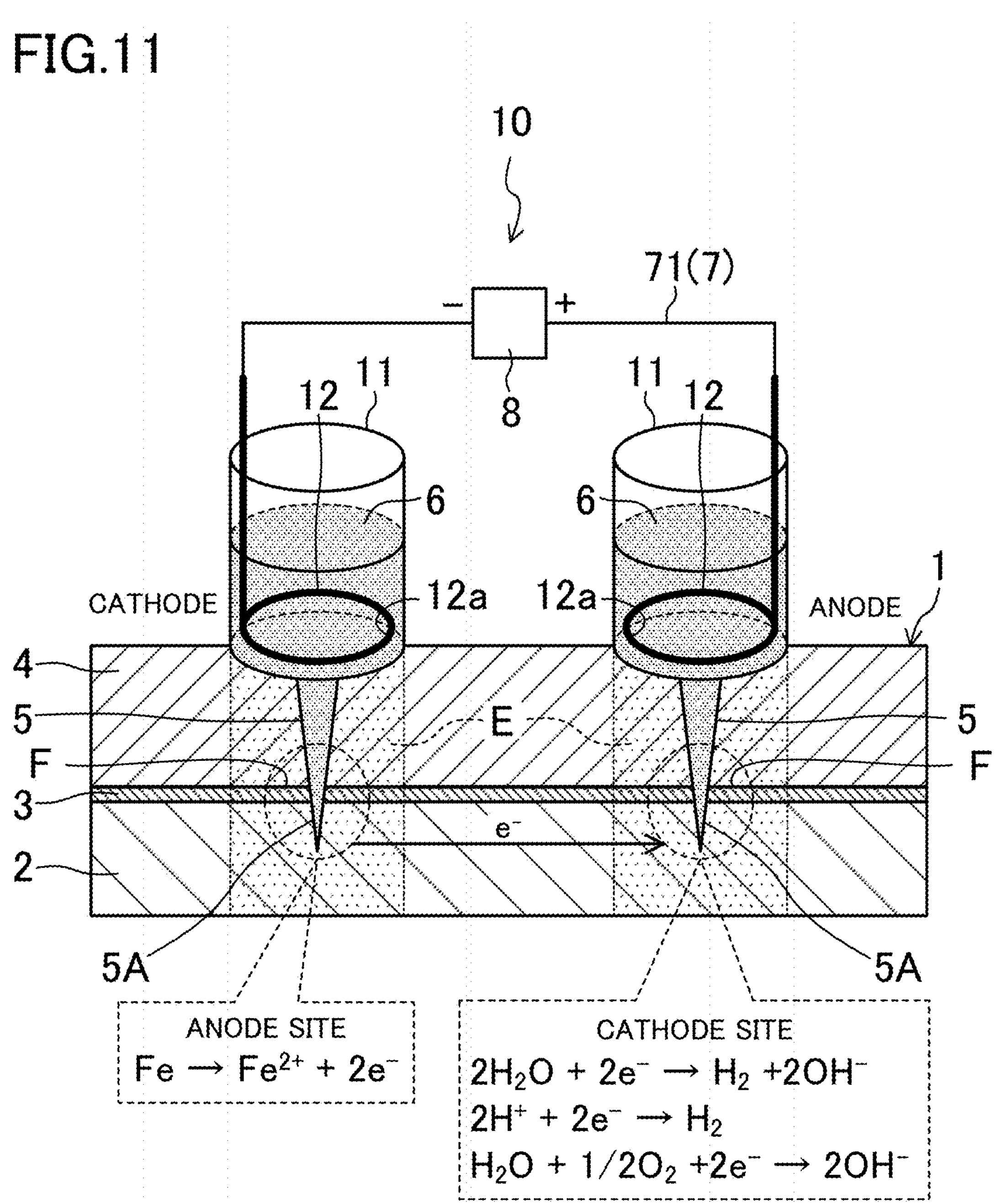
FIG. 11 is a diagram illustrating an example of a corrosion resistance test apparatus according to a third embodiment.

As illustrated in FIG. 11, a method of supplying a current between two electrodes 12, which are placed with water-containing materials 6 in containers 11 provided at two locations, may be employed as a test method.

In this case, a preparation step S1 includes placing the two containers 11, placing the two electrodes 12 in contact with the respective water-containing materials 6 in the two containers, and electrically connecting the two electrodes 12 to each other through an external circuit.

As illustrated in FIG. 11, a coated metal material 1 may have two damaged portions reaching a steel sheet 2 through an electrodeposition coating film 4 at two test target portions E. In this case, the two containers 11 are placed such that the water-containing materials 6 are in contact with the respective damaged portions.

In the present embodiment, a corrosion resistance test apparatus 10 includes the two containers 11, the two electrodes in contact with the respective water-containing materials 6 in the two containers, and the external circuit electrically connecting the two electrodes to each other.

In a current supply step S3, a current supplier 8 supplies a current between the two electrodes, one of which serves as an anode and the other serves as a cathode. This step causes the corrosion of the coated metal material 1 to progress.

For example, in FIG. 11, the electrode 12 on the left is the cathode, and the electrode 12 on the right is the anode. In this case, the test target portion E, preferably the damaged portion 5, on the left is an anode site, and the test target portion E, preferably the damaged portion 5, on the right is a cathode site.

At the anode site, anode reaction progresses, and the progress of cathode reaction is reduced. Thus, swelling of the electrodeposition coating film 4 hardly occurs.

On the other hand, at the cathode site, swelling of the electrodeposition coating film 4 progresses. In this way, the progress degree of corrosion of the coated metal material 1 can be evaluated by evaluation of the size of the swelling of the electrodeposition coating film 4 at the cathode site at the time when predetermined time has elapsed from the start of current supply.

The cathode reaction may progress also at the anode site depending on the size, shape, and other parameters of the damaged portions 5, and conditions in current supply with the current supplier 8 such as a current value. Specifically, in the present embodiment, it is preferable that the damaged portion 5 at which the anode reaction progresses and the damaged portion 5 at which the cathode reaction progresses out of two damaged portions 5 are separated clearly, but sometimes the separation is not clear. In this case, the swelling of the electrodeposition coating film 4 may progress also at the anode site. In such a case, the swelling of the electrodeposition coating film 4 may progress at both of the two damaged portions 5. Thus, in the calculation step S4, the progress degree of corrosion of the coated metal material 1 is calculated based on the damaged portion 5 with larger swelling of the electrodeposition coating film 4.

In this manner, the present embodiment allows separation between the anode site at which the anode reaction progresses with current supply and the cathode site at which the cathode reaction progresses with current supply, and further allows stable acceleration of the progress of both reactions and the progress of the swelling of the electrodeposition coating film 4. This allows a corrosion resistance test for the coated metal material 1 to be performed accurately in a very short time.

It is preferable to apply a constant current or a constant voltage, preferably a constant voltage, between the two electrodes 12 as in the first embodiment.

The current value flowing between the two electrodes 12 is preferably similar to that of the first embodiment.

In forming the damaged portions 5, at least one of the two damaged portions 5 is preferably in a dot shape. For a damaged portion 5 with a larger size of the swelling of the electrodeposition coating film 4, damage is preferably formed in a dot shape in the preparation step S1. Further, for a damaged portion 5 where the cathode reaction progresses in the current supply step S3, that is, a damaged portion 5 serving as the cathode site, is preferably formed in a dot shape. In this case, the shape of the damaged portion 5 serving as the anode site is not particularly limited, and may be, for example, a dot shape or a linear shape such as a cut made with a cutter.

The distance between the two damaged portions 5 is preferably 2 cm or more, more preferably 3 cm or more in order to easily check the swelling of the electrodeposition coating film 4.

The progress degree of corrosion obtained by the test method of FIG. 11 may be corrected based on the posture of the test target portion E, and corrosion resistance may be evaluated based on the obtained correction value. The progress degree of corrosion is corrected based on the posture of the test target portion, as described above. With this configuration, the error in the progress degree of corrosion due to the difference in the outgassing of hydrogen gas can be corrected, and therefore, the accuracy and reliability of the corrosion resistance test can be enhanced.

The present disclosure can provide a corrosion resistance test method, a corrosion resistance test apparatus, and a corrosion resistance test program for a coated metal material, which can improve the accuracy and reliability of a corrosion resistance test, regardless of the posture of a test target portion. The present disclosure is therefore significantly useful.

DESCRIPTION OF REFERENCE CHARACTERS

- 1 Coated Metal Material
- 2 Steel Sheet (Metal Base)
- 3 Chemical Conversion Coating (Metal Base)
- 4 Electrodeposition Coating Film (Surface Treatment Film)
- 6 Water-Containing Material
- 7 External Circuit
- 8 Current Supplier (Power Supply Unit, Detection Unit)
- 9 Control Device (Calculation Unit, Correction Unit, Evaluation Unit)
- 11 Container
- 12 Electrode
- 10 Corrosion Resistance Test Apparatus
- 100 Container Body
- 110 First Tubular Portion
- 120 Second Tubular Portion
- 130 Connection Portion
- 150 Angle Meter (Posture Measurement Means)
- 127A First Cutout
- 127B Second Cutout
- S1 Preparation Step
- S3 Current Supply Step
- S4 Calculation Step
- S5 Correction Step
- S6 Evaluation Step

What is claimed is:

1. A corrosion resistance test method for a coated metal material including a metal base and a surface treatment film provided on the metal base, the method comprising:

a preparation step of arranging one or two containers holding a water-containing material such that the water-containing material is in contact with the surface treatment film at a test target portion of the coated metal material and one electrode in contact with the water-containing material in the one container or two electrodes in contact with the respective water-containing materials in the two containers, and electrically connecting, through an external circuit, the electrode and the metal base to each other or the two electrodes to each other;

a current supply step of supplying a current, with a current supplier provided on the external circuit, between the electrode serving as an anode and the metal base serving as a cathode or between one of the two electrodes serving as an anode and the other electrode serving as a cathode to cause corrosion of the coated metal material to progress;

a calculation step of calculating a progress degree of the corrosion in the current supply step;

a correction step of correcting the progress degree of the corrosion based on a posture of the test target portion; and an evaluation step of evaluating corrosion resistance of the coated metal material based on a correction value for the progress degree of the corrosion, wherein the posture of the test target portion is represented by an inclination angle with respect to a reference posture of the test target portion, the reference posture is a posture in which the test target portion is substantially in a horizontal direction in a state in which the coated metal material is arranged with the surface treatment film on an upper side, the inclination angle is measured in the preparation step, and in the correction step, the progress degree of the corrosion is corrected based on a correlation, which is experimentally obtained in advance, between the inclination angle and the progress degree of the corrosion, and on the inclination angle measured in the preparation step.

2. The corrosion resistance test method of claim 1, wherein the correlation is a relationship in which the progress degree of the corrosion decreases in proportion to the inclination angle, and in the correction step, the progress degree of the corrosion is corrected based on Expression (1) below:

$$A_0 = A + a\theta \quad (1)$$

where $A_0$ is the correction value, A is the progress degree of the corrosion, a is a slope of the correlation, and θ is the inclination angle (0°≤θ≤90°).

3. The corrosion resistance test method of claim 1, wherein the correlation is a relationship in which the progress degree of the corrosion decreases in proportion to the inclination angle, and in the correction step, the progress degree of the corrosion is corrected based on Expression (2) below:

$$A_0 = A / [1 - (a/b)] \times \theta \quad (2)$$

where $A_0$ is the correction value, A is the progress degree of the corrosion, a is a slope of the correlation, b is an intercept of the correlation, and θ is the inclination angle (0°≤θ≤90°).

4. The corrosion resistance test method of claim 1, wherein the coated metal material has, at the test target portion, one or two damaged portions reaching the metal base through the surface treatment film, and the one or two containers are arranged such that the water-containing material is in contact with the one damaged portion or the two damaged portions.

5. The corrosion resistance test method of claim 4, wherein in the current supply step, progress of the corrosion of the coated metal material appears as swelling of the surface treatment film that occurs around the damaged portion, and in the calculation step, the progress degree of the corrosion is calculated based on a size of the swelling of the surface treatment film.

6. The corrosion resistance test method of claim 1, wherein in the current supply step, a DC constant current is applied between the electrode and the metal base or between the two electrodes.

7. The corrosion resistance test method of claim 1, wherein the surface treatment film is a resin coating film.

8. A corrosion resistance test apparatus for a coated metal material including a metal base and a surface treatment film provided on the metal base, the apparatus comprising:

one or two containers holding a water-containing material such that the water-containing material is in contact with the surface treatment film at a test target portion of the coated metal material;

one electrode in contact with the water-containing material in the one container or two electrodes in contact with the respective water-containing materials in the two containers;

an external circuit that electrically connects the electrode and the metal base to each other or the two electrodes to each other;

a current supplier provided on the external circuit and configured to supply a current between the electrode serving as an anode and the metal base serving as a cathode or between one of the two electrodes serving as an anode and the other electrode serving as a cathode;

a calculation unit that calculates a progress degree of corrosion of the coated metal material that has progressed due to the current supply;

a correction unit that corrects the progress degree of the corrosion based on a posture of the test target portion; and an evaluation unit that evaluates corrosion resistance of the coated metal material based on a correction value for the progress degree of the corrosion, wherein the posture of the test target portion is represented by an inclination angle with respect to a reference posture of the test target portion, and the reference posture is a posture in which the test target portion is substantially in a horizontal direction in a state in which the coated metal material is arranged with the surface treatment film on an upper side, and the correction unit corrects the progress degree of the corrosion based on a correlation, which is experimentally obtained in advance, between the inclination angle and the progress degree of the corrosion, and on the inclination angle.

9. The corrosion resistance test apparatus of claim 8, wherein the correlation is a relationship in which the progress degree of the corrosion decreases in proportion to the inclination angle, and the correction unit corrects the progress degree of the corrosion based on Expression (1) or Expression (2) below:

$$A_0 = A + a\theta \quad (1)$$

where $A_0$ is the correction value, A is the progress degree of the corrosion, a is a slope of the correlation, and θ is the inclination angle (0°≤0≤90°)

$$A_0 = A / [1 - (a/b)] \times \theta \quad (2)$$

where $A_0$ is the correction value, A is the progress degree of the corrosion, a is a slope of the correlation, b is an intercept of the correlation, and θ is the inclination angle (0°≤θ≤90°).

10. The corrosion resistance test apparatus of claim 8, wherein the coated metal material has, at the test target portion, one or two damaged portions reaching the metal base through the surface treatment film, and the one or two containers are arranged such that the water-containing material is in contact with the one damaged portion or the two damaged portions, progress of the corrosion of the coated metal material appears as swelling of the surface treatment film that occurs around the damaged portion, and the calculation unit calculates the progress degree of the corrosion of the coated metal material based on a size of the swelling of the surface treatment film.

11. A non-transitory computer-readable recording medium in which a corrosion resistance test program is recorded, program for a corrosion resistance test of a coated metal material including a metal base and a surface treatment film provided on the metal base, the corrosion resistance test including:

a preparation step of arranging one or two containers holding a water-containing material such that the water-containing material is in contact with the surface treatment film at a test target portion of the coated metal material and one electrode in contact with the water-containing material in the one container or two electrodes in contact with the respective water-containing materials in the two containers, and electrically connecting, through an external circuit, the electrode and the metal base to each other or the two electrodes to each other;

a current supply step of supplying a current, with a current supplier provided on the external circuit, between the electrode serving as an anode and the metal base serving as a cathode or between one of the two electrodes serving as an anode and the other electrode serving as a cathode to cause corrosion of the coated metal material to progress;

a calculation step of calculating a progress degree of the corrosion in the current supply step;

a correction step of correcting the progress degree of the corrosion based on a posture of the test target portion; and an evaluation step of evaluating corrosion resistance of the coated metal material based on a correction value for the progress degree of the corrosion, the program causing a computer to execute a process of the correction step, wherein the posture of the test target portion is represented by an inclination angle with respect to a reference posture of the test target portion, the reference posture is a posture in which the test target portion is substantially in a horizontal direction in a state in which the coated metal material is arranged with the surface treatment film on an upper side, the inclination angle is measured in the preparation step, and in the correction step, the progress degree of the corrosion is corrected based on a correlation, which is experimentally obtained in advance, between the inclination angle and the progress degree of the corrosion, and on the inclination angle measured in the preparation step.

* * * * *